(12) United States Patent
Hassan

(10) Patent No.: US 8,036,240 B2
(45) Date of Patent: Oct. 11, 2011

(54) SOFTWARE DEFINED COGNITIVE RADIO

(75) Inventor: Amer A. Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/956,487

(22) Filed: Dec. 14, 2007

(65) Prior Publication Data

US 2009/0154534 A1 Jun. 18, 2009

(51) Int. Cl.
*H04B 1/40* (2006.01)
(52) U.S. Cl. ............ 370/419; 370/331; 370/395.5; 375/219; 455/90.2
(58) Field of Classification Search .......... 370/331, 370/395.4; 455/343.4, 418–419; 329/304, 329/306
See application file for complete search history.

(56) References Cited

U.S. PATENT DOCUMENTS

| | | | |
|---|---|---|---|
| 5,557,644 A * | 9/1996 | Kuwabara | 375/340 |
| 5,706,428 A | 1/1998 | Boer et al. | |
| 6,052,600 A * | 4/2000 | Fette et al. | 455/509 |
| 6,163,766 A | 12/2000 | Kleider et al. | |
| 6,268,767 B1 * | 7/2001 | Maalej et al. | 329/304 |
| 6,680,649 B2 | 1/2004 | Rydin | |
| 6,947,397 B2 | 9/2005 | Kim et al. | |
| 6,959,171 B2 | 10/2005 | Tsien et al. | |
| 7,043,023 B2 | 5/2006 | Watanabe et al. | |
| 7,099,398 B1 | 8/2006 | Girardeau et al. | |
| 7,151,925 B2 | 12/2006 | Ting et al. | |
| 7,346,330 B2 * | 3/2008 | Kawabe et al. | 455/343.4 |
| 2004/0029575 A1 | 2/2004 | Mehta | |
| 2004/0101035 A1 | 5/2004 | Boer et al. | |
| 2004/0199659 A1 * | 10/2004 | Ishikawa et al. | 709/235 |
| 2004/0249915 A1 * | 12/2004 | Russell | 709/223 |
| 2005/0027789 A1 | 2/2005 | Luo et al. | |
| 2005/0286440 A1 | 12/2005 | Strutt et al. | |
| 2006/0008279 A1 * | 1/2006 | Chiang et al. | 398/202 |
| 2006/0046716 A1 | 3/2006 | Hofstaedter et al. | |
| 2006/0052094 A1 | 3/2006 | Kawabe et al. | |
| 2006/0154691 A1 | 7/2006 | Tang et al. | |
| 2006/0193295 A1 | 8/2006 | White et al. | |
| 2006/0198305 A1 | 9/2006 | Hamdi | |
| 2006/0211387 A1 | 9/2006 | Pisek et al. | |
| 2006/0287001 A1 | 12/2006 | Budampati et al. | |
| 2007/0078924 A1 | 4/2007 | Hassan et al. | |

FOREIGN PATENT DOCUMENTS

WO  WO 03/105337  * 6/2003
WO  WO2006006117 A1  1/2006

OTHER PUBLICATIONS

International Search Report dated Jun. 18, 2009, from corresponding International Application No. PCT/US2008/083875.

(Continued)

*Primary Examiner* — Dang Ton
*Assistant Examiner* — Mohamed Kamara
(74) *Attorney, Agent, or Firm* — Wolf, Greenfield & Sacks, P.C.

(57) ABSTRACT

A computing device with a software defined radio. The software defined radio has an architecture with separate components to provide control functions and data processing functions. The control components configure the data processing components so that the software defined radio provides desired operating characteristics. Components in the data plane may derive information indicating operating conditions, which can be provided to one or more of the control components. In response, the control components can modify components in the data plane to adjust to operating conditions.

20 Claims, 12 Drawing Sheets

OTHER PUBLICATIONS

Youngblood, G., "A Software-Defined Radio for the Masses, Part 1," http://www.ece.jhu.edu/~cooper/SWRadio/Yblood1.pdf, Jul./Aug. 2002, pp. 1-9.

"Software Defined Radio", http://www.altera.com/end-markets/wireless/software/sdr/wir-sdr.html, 4 pgs.

"Software Defined Radio," http://www.altera.com/end-markets/wireless/software/sdr/wir-sdr.html, 1pg.

"Software defined radio," http://www.wipro.com/webpages/insights/softwareradio.htm, 1 pg.

"Adaptive Rate Controller for Mobile Ad Hoc Networks" was downloaded at http://www.inderscience.com on Mar. 21, 2007.

"IEEE 802.11 MAC Performance with Variable Transmission Rates" was downloaded at http://www.ietcom.oxfordjournals.org on Mar. 21, 2007.

Javier del Prado Pavon et al., "Link Adaptation Strategy for IEEE 802.11 WLAN Via Received Signal Strength Measurement" *Wireless Communications and Networking Philips Research USA*, 6 pps.

Jongseok Kim et al., "CARA: Collision-Aware Rate Adaptation for IEEE 802.11 WLANs", *School of Electrical Engineering and INMC Seoul National University*, 11 pps.

H. Gharavi et al., "Rate Adaptive Video Transmission over Ad-Hoc Networks" *Electronic Letters*, vol. 40, No. 19, Sep. 16, 2004, pp. 2.

U.S. Appl. No. 11/239,945, filed Sep. 30, 2005, Hassan et al., Modularly Constructing a Software Defined Radio.

U.S. Appl. No. 11/239,782, filed Sep. 30, 2005, Hassan et al., Network Service for Modularly Constructing a Software Defined Radio.

U.S. Appl. No. 11/635,869, filed Dec. 8, 2006, Hassan et al., System Capability Discovery for Software Defined Radio.

U.S. Appl. No. 11/899,276, filed Sep. 5, 2007, Hassan et al., Simultaneous Wireless Support in Software Defined Radio.

U.S. Appl. No. 11/956,459, filed Dec. 14, 2007, Hassan et al., Software Defined Radio Architecture.

U.S. Appl. No. 11/956,469, filed Dec. 14, 2007, Hassan et al., Computer Radio With Pre-Defined Configuration Set.

U.S. Appl. No. 11/956,500, filed Dec. 14, 2007, Hassan et al., Computing Device With Configurable Antenna.

Hassan et al., Channel Reuse With Cognitive Low Interference Signals.

U.S. Appl. No. 12/269,319, filed Nov. 12, 2008, Hassan, Cognitive Error Control Coding for Channels With Memory.

* cited by examiner

SOFTWARE DEFINED COGNITIVE RADIO

BACKGROUND

Many computing devices are equipped with hardware that allows the computing device to wirelessly connect to a network or to other computing devices. Such wireless hardware frequently contains one or more radios, each with a transmitter, a receiver and data processing components.

In some devices, the wireless hardware has a predefined configuration such that each radio supports a connection according to a specific wireless technology, such as Wi-Fi, WiMAX, Bluetooth or HSDPA. For example, such a radio may communicate using a predefined frequency or frequencies and use a predefined sequence of control messages to connect with another device or exchange information. To support communication with different devices communicating using different wireless technologies, the wireless hardware may include multiple radios, each configured for communication using a specific wireless technology.

Some radios may support a number of closely related wireless technologies, such as variations of the 802.11 Standard. Likewise, some radios have parameters that may be set to adapt to operating conditions. For example, radios that adapt their transmitted data rates or transmitted power levels if a high error rate is encountered. Nonetheless, radios with predefined configurations are generally limited in the wireless technologies they can support.

In other devices, the wireless hardware may be configurable such that the wireless technology used for communication may change under software control, implementing what is sometimes called a "software defined radio." The wireless hardware is adapted to receive control inputs that can change operating parameters of the radio, such as the frequencies used for communication or data processing performed on received signals. By reconfiguring the operating parameters of the hardware, it may be possible for one group of hardware components to act as a radio for different wireless technologies.

SUMMARY OF INVENTION

A software defined radio is implemented to improve the experience for the user of a computing device, both by facilitating new functions and simplifying operation with known functions. In one aspect, the software defined radio has an architecture with a separate control plane and a data plane. The data plane performs data processing operations associated with wireless communication. The control plane can change the configuration of the data plane to change the wireless technology for which the radio operates or to adjust operating parameters without changing wireless technology.

With the flexibility provided through this architecture, the software defined radio can be configured or reconfigured to support efficient communication over one or more wireless technologies. As one example of the flexibility provided through a software defined radio, a feedback path may be readily created between components in the data plane and the control plane. Components in the data plane may generate status information about a communication channel in use, such as an error rate or noise level. This information may be provided to a cognitive module within the control plane that can identify adjustments to the components in the data plane that can adapt to ongoing operating conditions.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to embodiments of the invention, a software defined radio for a computing device is implemented with an architecture that allows easy configuration and reconfiguration in multiple scenarios. An example of an environment in which such a software defined radio may be employed is provided by FIG. 1.

Figure 1:
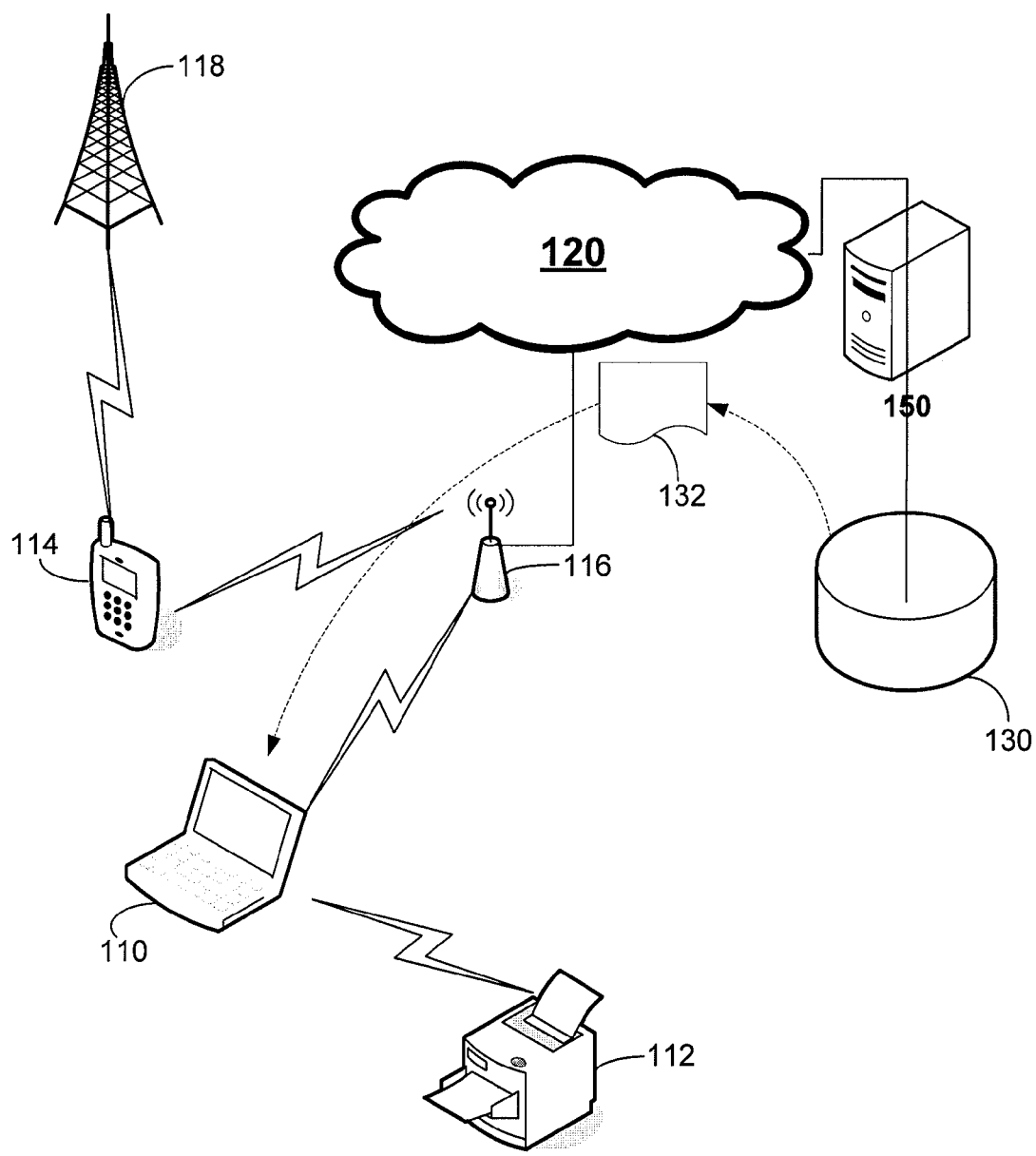
FIG. 1 is a sketch of a computing environment including a computing device with a software defined radio according to an embodiment of the invention.

FIG. 1 illustrates a networked computing environment in which multiple computing devices interact. One or more of the computing devices may contain a software defined radio according to embodiments of the invention. In the example illustrated, three computing devices communicating wirelessly as shown: laptop 110, printer 112, and Smartphone 114. Though three computing devices are illustrated, any number or type of computing devices may employ a software defined radio according to embodiments of the invention and three devices are illustrated for simplicity.

In this example, laptop computer 110 communicates wirelessly with an access point 116. Through access point 116, laptop computer 110 may gain access to network 120 and one or more devices connected to network 120. As an example of the types of devices that laptop computer 110 can access through network 120, FIG. 1 shows a server 150. In this example, server 150 may be a group policy server. As is known in the art, a group policy server may be configured to provide management information to clients that are domain joined. A group policy server provides a mechanism for a network administrator to provide policy information to the domain joined clients. Such servers may be used in enterprise networks to allow a network administrator to configure or otherwise manage network clients. Network clients, such as laptop computer 110, may be configured with an agent that, upon connection to network 120, accesses group policy server 150 to obtain or update group policy information.

Group policy server 150 may maintain group policy information in any suitable fashion. In the example of FIG. 1, group policy information may be maintained in database 130. Database 130 may represent any suitable computer storage media accessible by group policy server 150. In the example of FIG. 1, database 130 may contain group policy information as is known in the art. Alternatively or additionally, database 130 may contain information useful for configuring a software defined radio within laptop computer 110. For example, database 130 may contain one or more wireless technology specifications that, when downloaded to laptop computer 110 and applied to a software defined radio within laptop computer 110, configure the software defined radio for communications according to a specific wireless technology.

For example, FIG. 1 illustrates a wireless technology specification 132 being downloaded from database 130 through server 150 to laptop computer 110. The downloaded wireless technology specification 132 may configure the software defined radio within laptop computer 110 to communicate according to any suitable wireless technology. Wireless technology specifications downloaded to laptop computer 110 may be applied to a software defined radio sequentially or in parallel to change the function of a software defined radio within laptop computer 110 to support different wireless technology at different times or to support multiple wireless technologies concurrently.

For example, in FIG. 1 laptop computer 110 is communicating wirelessly with access point 116. Such communications with an access point for an infrastructure network are frequently performed using a wireless technology according to the 802.11 protocol. However, a user of laptop computer 110 may wish to access devices that are not connected to the infrastructure network 120, such as printer 112. Printer 112 may not support communication according to the same wireless technology as access point 116. Frequently, devices such as printer 112 are configured for communications using an ad hoc network and may use a wireless technology such as Bluetooth. Accordingly, wireless technology specification 132 may be applied to the software defined radio within laptop computer 110 to configure the radio to additionally communicate with printer 112 using a different wireless technology than used for communication through access point 116.

Printer 112 may also include a software defined radio that may similarly be configured for communications with a laptop computer 110. Though, it is not necessary that devices with software defined radios communicate only with other devices with software defined radios and a radio in printer 112 may be implemented in any suitable way.

Other computing devices may, like laptop 110, include a software defined radio that may be configured through the application of a wireless technology specification. For example, Smartphone 114 is shown communicating wirelessly with access point 116. As described above, communication with access point 116 may be in accordance with a wireless technology, such as an 802.11 protocol. Smartphone 114 may alternatively communicate with a general packet radio service (GPRS) network 118 using a different wireless technology. To support communications using two wireless technologies as illustrated in FIG. 1, Smartphone 114 may be equipped with a software defined radio that is programmed with multiple wireless technology specifications simultaneously.

Each computing device programmed with wireless technology specifications may obtain those wireless technology specifications in any suitable way. FIG. 1 shows as an example that a wireless technology specification may be obtained by a computing device through group policy server 150. More generally, a wireless technology specification may be obtained on a transportable computer storage media (such as a CD), obtained from any suitable server or obtained from any other suitable source.

As one example of the flexibility provided by this capability, a wireless device may download a wireless technology specification over the Internet or other publicly available network. An operator of a server reachable through the Internet may provide wireless technology specifications for a fee or other commercial consideration. For example, an operator of GPRS network 118 may provide wireless technology specifications allowing computing devices to access GPRS network 118. If access to GPRS network 118 is provided only to users who subscribe to the network service for a fee, the operator of GPRS network 118 receives a commercial benefit by enabling more users to access GPRS network 118 and therefore subscribe to the services provided through GPRS network 118.

As another example, a business or other entity may operate a website through which users of computing devices with software defined radios may purchase or license for a period of time a wireless technology specification enabling communications according to specific wireless technologies. This capability could be useful, for example, to a computer user preparing to travel to a foreign country where a wireless technology for which that user's computer is not configured is in widespread use. Prior to traveling to that foreign country, the computer user may wish to download a wireless technology specification so that the user may communicate wirelessly with networks or other devices in that foreign country. In this scenario, the wireless technology specification may be supplied by a business for a fee. Alternatively or additionally, the wireless technology specification may be provided in conjunction with a subscription to a wireless network in the foreign country, which may entail payment of a fee. In this way, a user of a computing device equipped with the software defined radio may greatly benefit from the expanded geographic area over which their computing device may communicate wirelessly. The same benefit may be achieved even if the networks accessed using a downloaded wireless technology specification are not in a foreign country. Accordingly, in embodiments of the invention, a wireless technology specification may be downloaded from any suitable server or obtained from any other data source for use in communicating with any suitable wireless devices in any suitable locations.

Figure 2:
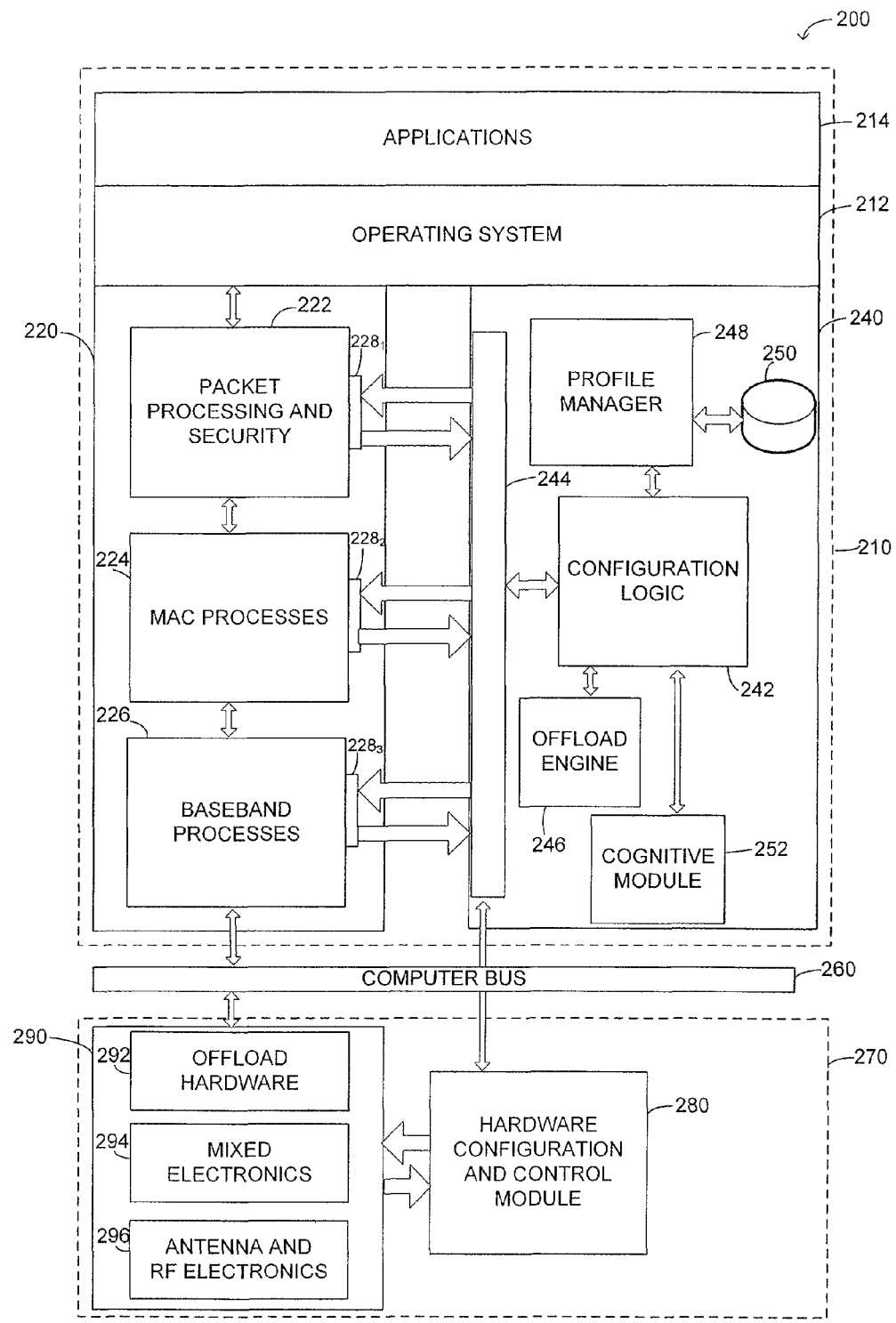
FIG. 2 is a block diagram of components within a computing device containing a software defined radio according to embodiments of the invention.

FIG. 2 illustrates an architecture of computing device 200 with a software defined radio that may be readily configured using a wireless technology specification, such as wireless technology specification 132 (FIG. 1). Such a computing device may be implemented using any suitable hardware. However, in the example of FIG. 2, computing device 200 includes a processor 210 coupled to a computer bus 260. Computer bus 260, for example, may be a PCI bus. However, any suitable bus may be used within computing device 200. Over computer bus 260, processor 210 may communicate with one or more other hardware components. In the example of FIG. 2, a radio card 270 is illustrated.

Processor 210 may be any suitable processor or processors and each processor may have one or multiple cores. However, for simplicity a single processor 210 is illustrated. Likewise, hardware components used in implementing a software defined radio may be packaged in any suitable way. For example, hardware components implementing a software defined radio may be implemented on a separate wireless network interface card or may be incorporated with hardware components performing other functions within computing device 200. As a further example of a possible variation, hardware components for implementing a software defined radio may be spread across multiple cards connected to computer bus 260. Accordingly, FIG. 2 shows an example embodiment in which a single radio card 270 incorporates all of the hardware components for a software defined radio, but any suitable packaging of the hardware components may be employed.

FIG. 2 also illustrates software components that may execute within computing device 200. In the embodiment illustrated, the software components may be stored as computer executable instructions and configuration parameters in computer storage media associated with processor 210. The software components may be configured in any suitable way. In the embodiment illustrated, the software components include an operating system 212. Operating system 212 may be a computer operating system as is known in the art, though any suitable operating system may be used. Operating system 212 may provide multiple functions accessed by applications 214 executing on computing device 200. The number and type of application components 214 may depend on the type and function of computing device 200. However, examples of applications 214 may include a web browser, email application or other applications that may generate or consume data that is transmitted or received wirelessly using a software defined radio.

Operating system 212 may provide an interface between applications 214 and the software defined radio. The operating system 212 may also provide higher level network functions than are provided by a radio. For example, a radio may provide network functions at levels 1 through 3 of the OSI layered network model. Operating system 212 may provide support for functions at higher network layers. In this scenario, the operating system may support connections between applications 214 and applications in other computing devices. For example, applications frequently communicate using a TCP protocol or other connection-based protocols. Operating system 212 may contain components that establish and maintain connections with applications in other devices, though relying on the software defined radio to physically convey data for that connection to the other device.

Such partitioning of functions between an operating system and a radio is known in the art, whether or not a software defined radio is employed. Accordingly, the specific partitioning of communication functions between operating system 212 and software defined radio within computing device 200 is not critical to the invention.

In the example of FIG. 2, a software defined radio is implemented with software components segregated into a data plane 220 and a control plane 240. Data or control messages related to specific wireless technologies generated by an application 214 or operating system 212 for transmission wirelessly passes through data plane 220 before it is applied to radio card 270 for transmission. The specific processing performed by the components within data plane 220 may be defined and configured by components within control plane 240. Data or control messages related to specific wireless technologies received wirelessly on radio card 270 may be passed through components of data plane 220 on its way to operating system 212 or to applications 214. The processing within data plane 220 performed on received data may likewise be defined and configured by components within control plane 240.

In the embodiment illustrated, the hardware components on radio card 270 may likewise be segregated into a control plane and a data plane. In the embodiment illustrated, data plane 290 is illustrated as containing multiple components. A hardware control plane within radio card 270 is implemented in a single module 280. However, the number and types of modules within each of the control and data planes are not critical to the invention.

In the embodiment illustrated, software data plane 220 includes a packet processing and security module 222, a media access control module (MAC) 224 and baseband processes module 226. The specific functions performed within each of these modules may depend on the configuration of the software defined radio. However, packet processing and security module 222, when processing for data to be transmitted, may receive the data from operating system 212 and format the data into packets in accordance with any protocols used by the wireless technology for which the software defined radio is configured to implement. As part of forming packets, packet processing module 222 may perform a packet level encryption, apply a signature to a packet for authentication or perform other security functions for the data to be transmitted wirelessly.

Components within MAC processes module 224 may perform one or more MAC functions as appropriate for the wireless technology for which the software defined radio is configured. For example, components within MAC processes module 224 may establish a channel over which computing device 200 may wirelessly communicate with another wireless device, determine when data may be transmitted over that channel or specific frequencies to be used for communication over that channel.

In addition to other functions, when processing data to be transmitted, components within MAC processes module 224 may receive packets defined within packet processing and security module 222 and convert each packet into a stream of source bits for transmission.

Those source bits may be provided to components within baseband processes module 226 for further processing and ultimately for application to hardware components on radio card 270 for wireless transmission. For example, a component within baseband processes module 226 may encode the source bits using a forward error correction algorithm. Another component may digitally modulate the encoded bit stream, such as by mapping groups of bits to symbols for transmission. An example of a modulation scheme that may be used is Quadrature Amplitude Modulation (QAM) using phase and, amplitude keying. However, the specific modulation functions employed may depend on the wireless technology implemented by the software defined radio. In addition, components within processes module 224 may also filter the modulated bit stream using one or more in digital filtering algorithms. As with the other components within baseband processes module 226, the specific function performed by filtering components may depend on the wireless technology to be implemented.

For transmission of data, data processing may also be performed by hardware components on radio card 270. Accordingly, hardware card 270 may include one or more hardware components within data plane 290. In the example of FIG. 2, hardware data plane 290 includes offload hardware module 292, mixed electronics module 294 and antenna and RF electronics 296. Each of the hardware modules may be implemented using known digital and/or analog electronic circuit components. The specific implementation of each of the hardware modules may depend on the range of wireless technologies supported by radio card 270. However, as an example, antenna and RF electronics module 296 may contain, to support transmitting data, a power amplifier and a frequency converter for performing a frequency up-conversion. The frequency range over which the up-converter operates may depend on the frequency range over which radio card 270 may operate.

In addition, antenna and RF electronics module 296 may contain one or more antennas coupled to the power amplifier. In some embodiments, an antenna may be configurable for operation at different frequencies, with a specific configuration selected based on the wireless technology or technologies to be supported by the software defined radio. In other embodiments, antenna and RF electronics module 296 may contain multiple antennas that may be switchably connected to RF electronics components within module 296. In this embodiment, the antenna switched to the RF electronics may be selected to match the frequency of the signals to be transmitted. Such antennas may be implemented as patch antennas as is known in the art or in any other suitable way. In some embodiments, the antenna or antennas within antenna and RF electronics module 296 may be implemented on radio card 270. However, in some embodiments, the antennas may be positioned in any suitable location within computing device 200.

Mixed electronics module 294 may contain, for processing data to be transmitted, components that convert data generated by software processing into an analog signal for transmission by antenna and RF electronics module 296. For example, mixed electronics module 294 may contain a digital to analog converter as is known in the art. However, any suitable components may be used.

Offload hardware module 292 may contain hardware components that may perform some or all of the functions that may be performed within software data plane 220. Incorporation of offload hardware module 292 into radio card 270 provides an option for configuring a software defined radio to perform some functions either in software or in hardware. In the embodiment illustrated, offload hardware module 292 is an optional component on radio card 270. Accordingly, when configuring a software defined radio, if offload hardware module 292 is present and contains a component to perform a function that is used to implement a desired wireless technology, a component within offload hardware module 292 may be configured to perform that function. Alternatively, if offload hardware module 292 is not present or does not include a component to implement a function that is part of a desired wireless technology, that function may be implemented in software data plane 220.

Regardless of the specific components within each of the modules in software data plane 220 and hardware data plane 290, the collection of components implements the functions used for transmitting data according to a specific wireless technology. The components in software data plane 220 and hardware data plane 290 also collectively implement the functions for receiving data according to specified wireless technologies. Accordingly, antenna and RF electronics module 296 may contain one or more antennas to receive a wireless signal conveying that data. In some instances, the same components may be used for transmission and receipt of data. For example, antennas within antenna and RF electronics module 296 may be used for both transmission and reception of data. In other instances, separate components may be included for processing transmitted and received data.

Antenna and RF electronics module 296 may include a low noise amplifier and a down converter for processing received data in addition to a power amplitude and up-converter for transmitting data. Mixed electronics module 294 may include an analog to digital converter for converting a received analog signal into a digital signal for further processing. Similarly, offload hardware module 292 may include components for performing functions on received data instead of or in addition to components for performing function on transmitted data.

Modules within software data plane 220 may likewise contain components for processing received data. For example, baseband processes module 226 may include a filter for operating on received data, which may be the same or different than the filter used for operating on transmitted data. Other components within baseband processes module 226 may demodulate received signals or decode demodulated signals. In some embodiments, the demodulation and decoding operations for received signals will be the inverse of the error correcting and modulation functions performed for transmitted data. However, the specific functions performed within each module may be configured according to a particular wireless technology to be implemented.

In the embodiment illustrated, a received signal, following processing within baseband processes module 226 may be provided to components within MAC processes module 224 for further processing. Those components may form a stream of bits output by baseband processes module 226 into packets or otherwise process the received data. In addition, components within MAC processes module 224 may acknowledge packets when received or otherwise perform a function to maintain communication according to a protocol applicable to a wireless technology implemented by the software defined radio.

Components within packet processing and security module 222 may also perform functions on received data. Those components may provide decryption or authentication functions that could be the inverse of the functions applied to transmitted data. In addition, components within packet processing and security module 222 may group packets or otherwise process them before notifying operating system 212 that packets have been received. Processing to notify packets to operating system 212 may be as is known in the art, though any suitable mechanism may be used and, as with other functions of the software defined radio, in some embodiments may be configurable.

To implement a software defined radio for a desired wireless technology or technologies, one or more of the hardware and software modules in the software data plane 220 and hardware data plane 290 may be configured. In the embodiment illustrated, components within the software data plane 220 are configured by components within control plane 240. In the embodiment illustrated, software control plane 240 includes a radio configuration and control module 244 that provides an interface to each of the configurable components within software data plane 220.

The specific mechanism by which radio configuration and control module 244 interacts with configurable components within software data plane 220 is not critical to the invention and any suitable mechanism may be used. However, in the embodiment illustrated, each of the modules 222, 224 and 226 includes a defined programming interface $228_1$, $228_2$, and $228_3$, respectively. Each of the interfaces $228_1$, $228_2$, and $228_3$ may be in a form that is published or otherwise made known to parties wishing to develop software components for use in a software defined radio. In this way, regardless of which components are included within data plane 220, radio configuration and control module 244 may interface with those components.

Though the specific format of the interface is not critical to the invention, in the embodiment illustrated, interfaces $228_1$, $228_2$, and $228_3$ allow for a two-way exchange of information, allowing status and control information to pass through the interface. Each of the components in software data plane 220 may, through an interface such as $228_1$, $228_2$, or $228_3$, provide status information, defining its operational status as well as its operational capabilities. For example, components within packet processing and security module 222 may communicate to radio configuration and control module 244 through interface $228_1$ specific security functions that they can support. Interface $228_1$ may also allow radio configuration and control module 244 to control which of those functions should be performed on packets to be transmitted or on received packets. Similarly, interface $228_2$ may allow components within MAC processes module 224 to identify the functions they can perform and to allow radio configuration and control module 244 to configure those components to perform functions used in implementing a desired wireless technology. A similar two-way exchange of information may occur through interface $228_3$, allowing radio configuration and control module 244 to determine functions supported by components within baseband processes module 226 and to specify a configuration for those components.

In the embodiment illustrated in FIG. 2, radio configuration and control module 244 also interfaces to hardware components on radio card 270. In the embodiment illustrated, hardware configuration and control module 280 serves as an interface between radio configuration and control module 244 and the hardware components in hardware data plane 290. The specific form of the interface between radio configuration and control module 244 and hardware configuration of control module 280 is not critical to the invention. However, in the illustrated example, the form of the interface is made known to the party implementing radio card 270 and is implemented over a standard computer bus. In this way, computing device 200 may be constructed using a radio card 270 from any suitable source electing to implement the interface to radio configuration and control module 244 using the format of bus 260.

Hardware configuration and control module 280 may be implemented using any suitable hardware components. For example, hardware configuration and control module 280 may be implemented as a gate array chip mounted to radio card 270. However, radio card 270 may be implemented using one or more application specific integrated circuits (ASIC), and hardware configuration and control module 280 may be implemented as one or more segments of such an ASIC.

Regardless of the specific implementation of hardware configuration and control module 280, in the embodiment illustrated, module 280 provides an interface to the hardware components in hardware data plane 290 that may be used either to configure the components or to obtain capability or other status information about those components. For example, hardware configuration and control module 280 may write values into control registers associated with hardware modules 292, 294 or 296. Conversely, hardware configuration and control module 280 may read status registers from those modules. Regardless of the specific interface mechanism between hardware configuration and control module 280 and the hardware components within hardware data plane 290, hardware configuration and control module 280 may provide to radio configuration and control module 244 the and status data obtained from the hardware components and may apply configurations to the hardware components as specified by radio configuration and control module 244.

In passing control and status information between radio configuration and control module 244 and hardware components within hardware data plane 290, hardware configuration and control module 280 may convert or otherwise process the information. As one example, mixed electronics module 294 may receive as a configuration input a specific digital code specifying an amount of frequency up-conversion to perform on a signal carrying transmitted data. Radio configuration and control module 244 may specify frequency up-conversion in a format different than that received by mixed electronics module 294. In that scenario, hardware configuration and control module 280 may be configured to receive a desired operating parameter for mixed electronics module 294 in a format generated by radio configuration and control module 244 and convert it into a format that can be applied by mixed electronics module 294 to achieve the desired amount of frequency up-conversion.

The specific functions that each of the components within hardware data plane 290 and software data plane 220 is configured to perform may depend on the overall configuration of the software defined radio. In the embodiment illustrated, the configuration was driven both by the wireless technology to be implemented by the radio and, if the wireless technology has variable parameters of operation, the specific parameters of operation selected for implementation at any given time. For example, a radio supporting Wi-Fi may be configured differently than a radio supporting a different technology, such as Wi-MAX. In addition, some wireless technologies, such as Wi-Fi, support different data rates or have other parameters that may be varied in use. One or more of the components implementing a software defined radio may be configured differently, depending on the data rate or values of other parameters to be supported for Wi-Fi communications.

Control plane 240 may contain one or more components to determine, based on a desired wireless technology and parameters of that wireless technology at any time, the specific configuration of the software defined radio. In the embodiment illustrated in FIG. 2, configuration logic module 242 performs that function. The specific implementation of configuration logic module 242 is not critical to the invention. As an example, configuration logic module 242 may be implemented as a rules engine, applying a set of rules to determine a specific configuration for each of the components in software data plane 220 and hardware data plane 290 at any given time based on one or more inputs received from a user or other components within computing device 200 and information on operating conditions. However, the specific implementation of configuration logic module 242 is not critical to the invention and any suitable implementation may be used.

Regardless of the specific implementation of configuration logic module 242, module 242 may receive one or more types of inputs used in determining a desired configuration for the hardware and software components of the software defined radio at any given time. In the embodiment of FIG. 2, inputs are provided to configuration logic module 242 from a cognitive module 252, an offload engine 246, and profile manager 248.

In the embodiment illustrated, profile manager module 248 provides to configuration logic module 242 the specification of a wireless technology to be implemented by the software defined radio. The specification may define the functions to be collectively implemented by components within software data plane 220 and hardware data plane 290. Those functions may be specified in any suitable way. For example, the functions may be specified by indicating operating parameters of one or more components within software data plane 220 and hardware data plane 290. Alternatively or additionally, the specification may include executable code that may be added as a component to one or more of the modules within software data plane 220.

Profile manager module 248 may obtain specifications of wireless technologies in any suitable way. In the embodiment illustrated, control plane 240 includes a profile store 250 containing one or more wireless technology specifications. Profile store 250 may be implemented in computer storage media associated with computing device 200. As described in connection with FIG. 1, specifications for wireless technologies, such as specification 132 (FIG. 1) may be downloaded over a network from a server or other suitable source. However, the source of wireless technology specifications in profile store 250 and the specific implementation of profile store 250 are not critical to the invention and any suitable mechanisms may be used to obtain wireless technology specifications and selecting one or more specifications for use at any given time.

In addition to providing wireless technology specifications to configuration logic module 242, profile manager module 248 may provide input to configuration logic module 242 indicating which wireless technologies to be implemented by a software defined radio at any time. Profile manager module 248 may provide indications of wireless technologies to implement based on input received from one or more sources. For example, profile manager module 248 may include a user interface, allowing a user to select a wireless technology for implementation by a software defined radio. Similar input may be received alternatively or additionally from operating system 212, applications 214, a group policy store on computer 200 that was downloaded from a group policy server or any other suitable source.

Configuration logic module 242 may also receive input concerning a desired configuration of components within software data plane 220 and hardware data plane 290 from offload engine module 246. As indicated in FIG. 2, radio card 270 may include offload hardware module 292. When present, offload hardware module 292 may perform functions that could also be performed by software components within software data plane 220. Offload engine module 246 receives and analyzes capability information output by offload hardware module 292. Using this capability information, offload engine module 246 may analyze a wireless technology specification to determine whether any of the functions needed to implement the wireless technology specification may be performed in offload hardware module 292. If offload hardware module 292 supports any of the needed functions, offload engine module 246 may provide an indication to configuration logic module 242 that certain functions may be allocated to offload hardware module 292. In response, configuration logic module 242 may generate appropriate configuration commands, causing those functions to be implemented by components within offload hardware module 292.

In some embodiments, offload engine module 246 may perform additional processing before indicating to configuration logic module 242 that hardware components are available to perform certain data processing functions. For example, hardware within computing system 200 may be limited in one or more ways and overall operation of computing system 200 may, in some instances, be optimized by configuring software components to perform data processing functions even if offload hardware module 292 contains components that could perform the same functions.

Offload engine module 246 may be implemented in any suitable way. For example, offload engine module 246 may be implemented using rule-based technology.

In addition, configuration logic module 242 may receive input from cognitive module 252 that configuration logic module 242 may use in configuring hardware and/or software components of the software defined radio. In the embodiment illustrated, cognitive module 252 receives status information concerning operation of the hardware and/or software components implementing a software defined radio. Based on the status information, cognitive module 252 may perform processing to recognize that an adaptation is required in the configuration of the software defined radio. In some embodiments, the adaptation may involve modifying an operating parameter within a wireless technology.

For example, many wireless technologies support operation at multiple frequencies. Status information output by one or more of the components may allow cognitive module 252 to identify that a different channel should be used. For example, a received signal output by a component within antenna and RF electronics module 296 may indicate that certain frequencies are less utilized or have less interference than frequencies currently in use by the software defined radio. In this scenario, cognitive module 252 may report to configuration logic module 242 that a different frequency would provide more reliable communication and configuration logic module 242 may generate configuration commands to one or more of the hardware or software components in the software defined radio to change the frequency.

Alternatively or additionally, cognitive module 252 may identify conditions requiring other adaptations within a wireless technology. For example, cognitive module 252 may identify that either a lower or higher transmit power level is desirable. In response, configuration logic module 242 may generate commands configuring a power amplifier within antenna and RF electronics module 296 to transmit at a different power level.

More generally, cognitive module 252 may collect status information from any component within software data plane 220 or hardware data plane 290 and perform processing on the status information to identify a condition with ongoing communications that warrants an adaptation. In many instances, the status information will relate to communications, such as measured errors or an amount of data to be transmitted. However, the status information used by cognitive module 252 need not be so limited. The status information may include battery life or other information about computing device 200 or any other available information useful in selecting or setting parameters of a wireless technology.

The adaptation may be implemented by configuration logic module 242 issuing commands that reconfigure one or more of the components in either software data plane 220 or hardware data plane 290 to cause the adaptation without charging the wireless technology implemented by the software defined radio.

Cognitive module 252 is not limited to identifying adaptations within the same wireless technology. In some embodiments, cognitive module 252 may be configured to recognize that more efficient communications may be achieved by communicating using a different wireless technology. In such an embodiment, configuration logic module 242 may obtain from profile manager module 248 a specification for a different wireless technology. Configuration logic module 242 may then generate configuration commands to reconfigure the software defined radio to communicate using a different wireless technology. In this way, computing device 200 may be flexibly controlled to implement efficient communication by adapting within a wireless technology or across wireless technologies.

Figure 3:
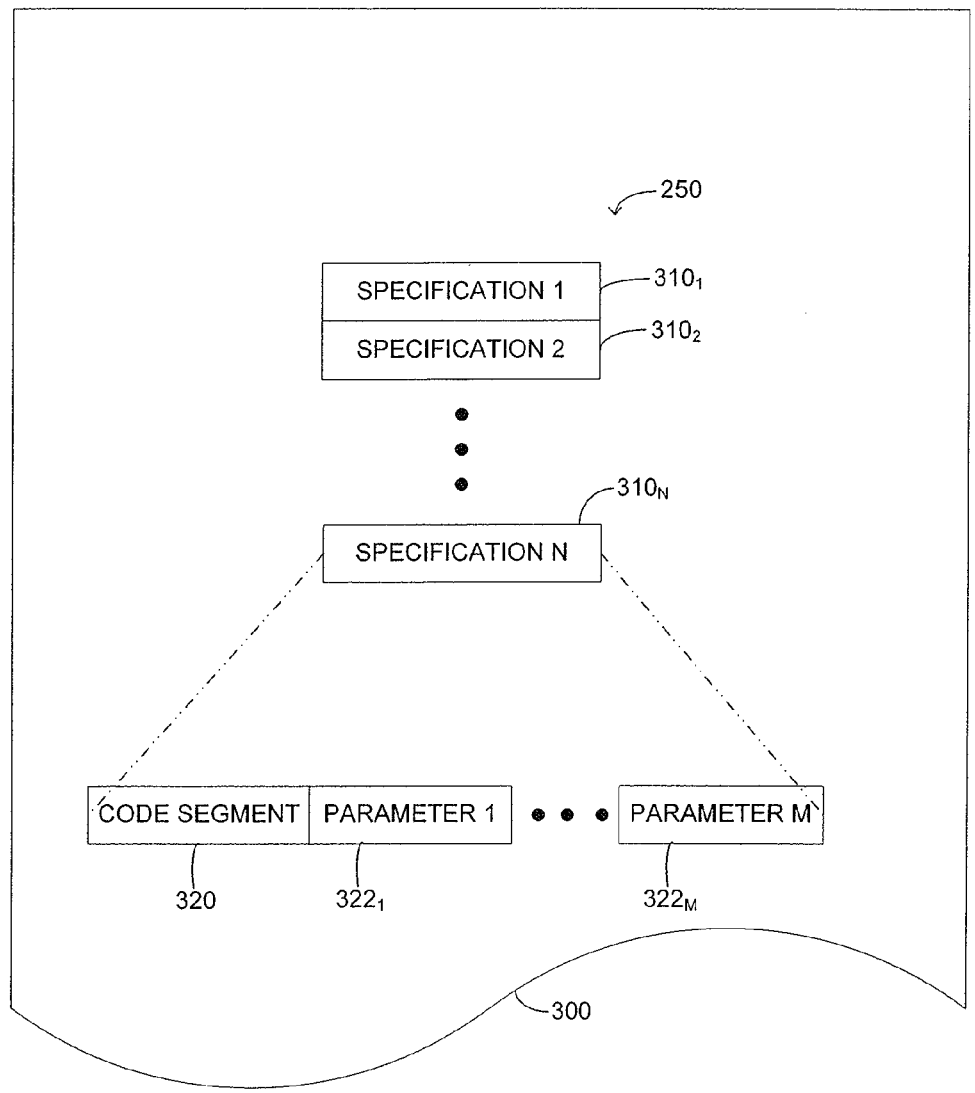
FIG. 3 is a sketch of data structure for a library of wireless technology specifications according an embodiment of the invention.

If an adaptation to a different wireless technology is desired, profile manager 248 may obtain a wireless technology specification from profile store 250 and provide the specification to configuration logic 242. Specifications may be stored in profile store 250 in any suitable way. FIG. 3 illustrates as one example, a possible implementation of profile store 250.

As illustrated in FIG. 3, profile store 250 may be implemented in any suitable computer storage media. For example, data defining one or more specifications may be recorded on computer storage media 300. In the example illustrated, records $310_1$, $310_2$, ... $310_N$ are shown, each storing information defining a specification for a wireless technology.

The specific format in which information defining a wireless technology is stored within each of the records $310_1$ ... $310_N$ is not critical to the invention. However, an exemplary structure for record $310_N$ is shown. In the example of FIG. 3, record $310_N$ contains multiple fields, each field defining information used in configuring the software defined radio. In this example, each record contains two types of fields. One type of field, represented by field 320, contains information identifying executable code. The executable code identified in field 320 may be a component or components of any of the modules within software data plane 220 (FIG. 2). Executable code may be identified in field 320 in any suitable way. For example, computer executable instructions may be stored as part of record $310_N$. As another example, field 320 may include a list of executable components stored elsewhere within computing device 200 (FIG. 2). As a further example of a possible implementation, field 320 may store one or more links to storage locations outside of computing device 200 from which executable components may be obtained.

In addition, record $310_N$ is shown to contain multiple fields, represented by fields $322_1$ ... $322_M$, that store parameters for configuring hardware or software components in hardware data plane 290 or software data plane 220 (FIG. 2). The information in fields $322_1$ ... $322_M$ may be stored in any suitable form, which may depend on the specific hardware or software components to which the values in fields $322_1$ ... $322_M$ are to be applied.

Figure 4:
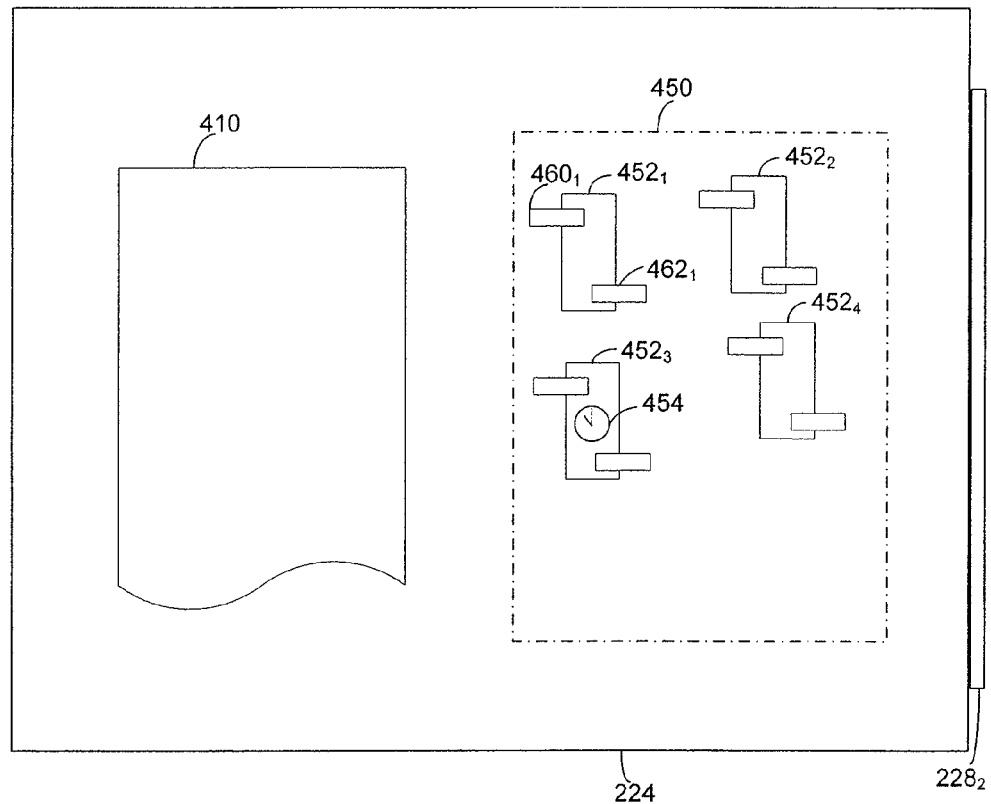
FIG. 4 is a sketch of a software module of a software defined radio according to an embodiment of the invention.

With a wireless technology specification in the form illustrated in FIG. 3, components within control plane 240 may configure a software defined radio by providing executable components and/or specifying values of operating parameters of those components. FIG. 4 illustrates an example module within a software defined radio that has been configured by application of one or more specifications in the form illustrated in FIG. 3.

FIG. 4 shows as an example of a module within software data plane 220 MAC processes module 224. However, in some embodiments, each of the modules within software data plane 220 may have an architecture generally as illustrated in FIG. 4.

FIG. 4 shows that MAC processes module 224 includes an interface $228_2$ through which radio configuration and control module 244, or any other suitable component, may configure the module. Through interface $228_2$, executable components may be added to module 224. In the operating state depicted in FIG. 4, executable components $452_1$, $452_2$, $452_3$ and $454_4$ have been added.

Each of the components $452_1$ ... $452_4$ may represent a programming object or component in any other suitable form. Each of the components $452_1$ ... $452_4$ may perform one or more of the functions performed within module 224. In the example in which module 224 performs MAC processes, each of the components within component group 450 may perform a function associated with MAC processes, such as responding to a control packet or grouping received packets that have been fragmented. However, the specific number and function of components within component group 450 may depend on the function of module 224 and the wireless technology or technologies for which the software defined radio has been configured.

Though the specific format in which components $452_1$ ... $452_4$ are implemented is not critical to the invention, the example embodiment shows that each of the components may have the same general format. In the embodiment illustrated, each of the components within component group 450 is implemented as a "plug in." When implemented as a plug in, each of the components $452_1$ ... $452_4$ includes one or more interfaces in a defined format, allowing other components of computing system 200 to interact with the components. In this way, components may be readily added to component group 450 as new functions to be implemented by software defined radio are identified.

As one example, wireless technology protocols frequently undergo multiple revisions. It may be desirable, for each revision, to generate one or more components that perform functions necessary to implement the revised protocol. With the flexibility provided by the architecture of FIG. 4, a computing device 200 may be readily configured to operate according to a modified protocol, even though not specifically designed for that protocol.

To support operation as a plug in, each of the components within component group 450 may implement one or more defined interfaces. In the embodiment illustrated, each of the components within component group 450 implements two interfaces. Taking component $452_1$ as illustrative, an interface $460_1$ and an interface $462_1$ are shown. Interface $460_1$ may be a data interface and interface $462_1$ may be a control interface. Through interface $460_1$, other components within computing device 200 may supply data to component $452_1$ for processing. Alternatively or additionally, other components within computing device 200 may obtain data processed by component $452_1$ through interface $460_1$. Depending on the type and nature of component $452_1$, operating system 212, other components within module 224 or within other modules may exchange data with component $452_1$ through interface $460_1$.

Component $452_1$ is also shown to contain control interface $462_1$. In the embodiment of FIG. 2, radio configuration and control logic 244 may receive status information from component $452_1$ and provide control information to component $252_1$ through interface $462_1$. For example, through interface $462_1$, component $452_1$ may receive values of parameters specifying one or more aspects of the operation of component $452_1$. Alternatively or additionally, component $452_1$ may use interface $462_1$ to provide status information.

In some embodiments, all of the functionality within module 224 may be implemented by components within component group 450. However, in some embodiments, module 224 may include one or more fixed components 410. The fixed components 410 may be present in module 224 regardless of the specific configuration of the radio at any given time. For example, fixed component 410 may coordinate operation of components within component group 450, facilitate interfacing between the components in component group 450 and other components of computing device 200 (FIG. 2) or perform functions that are performed by module 224 regardless of configuration.

FIG. 4 illustrates a further feature that may be implemented using the componentized architecture of FIG. 4. Some or all of the components may incorporate digital rights management to control some aspect of the usability of those components. In the example of FIG. 4, component $452_3$ is shown to include digital rights management, as illustrated symbolically by rights management element 454. Rights management element 454 may represent a cryptographic mechanism applied to component $452_3$ that precludes execution of component $452_3$ except under allowed conditions. The conditions under which execution of component $452_3$ are allowed may be defined as is known in the art of digital rights management or in any other suitable way. As one example, the conditions may be defined based on time. Rights management element 454 may preclude execution of component $452_3$ after a predefined time. With this capability, components that provide functions for a software defined radio may be "leased."

Alternatively, rights management element 454 may be used to control other conditions under which component $452_3$ is allowed to execute. For example, component $452_3$ may be allowed to execute only for so long as the user of computing device 200 maintains a subscription to a network or other service.

Figure 5A:
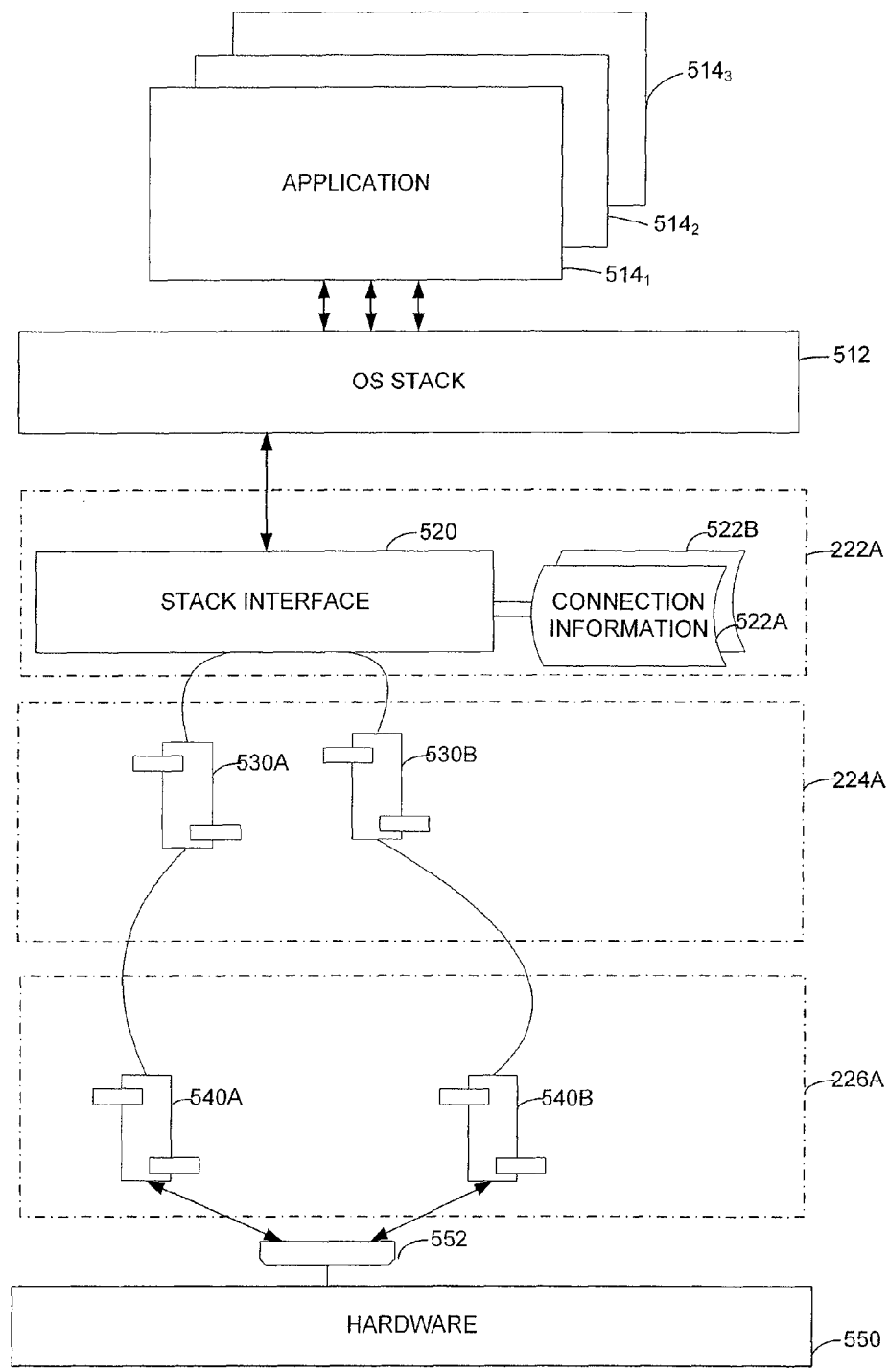
FIG. 5A is a sketch of a computing device incorporating a software defined radio in a first configuration according to an embodiment of the invention.

Turning to FIG. 5A, a further example is provided of a function that may be implemented with the software defined radio using an architecture according to embodiments of the invention. FIG. 5A illustrates that a software defined radio may be configured to support communications using multiple wireless technologies concurrently. Multiple wireless technologies may be supported concurrently by configuring modules of the software defined radio to implement all functions collectively performed by all of the multiple wireless technologies to be implemented.

In the example of FIG. 5A, one or more applications $514_1$, $514_2$ and $514_3$ generate and/or consume data for wireless communications. Applications $514_1$ . . . $514_3$ may interface with a software defined radio through an operating system stack 512, using a stack mechanism as is known in the art. However, in the example of FIG. 5A, application $514_1$ may communicate using a different wireless technology than application $514_3$.

The operating system stack 512 may interface with the software defined radio using any suitable interface. However, a conventional stack interface may be employed. Accordingly, packet processing and security module 222 is shown to have a stack interface 520, which may be implemented as is known in the art. However, to the extent packet processing and security module 222 stores different types of connection information for connections using different wireless technologies, two components may be included within packet processing and security module 222 to store connection information for the wireless technologies used by applications $514_1$ and $514_3$. Accordingly, FIG. 5A illustrates components 522A and 552B storing connection information for two wireless technologies.

In addition, MAC processes module 224 may also contain components to implement two wireless technologies. In this example, component 530A is shown to implement the wireless technology used by application $514_1$ and component 530B is shown to implement the wireless technology used by application $514_3$.

Likewise, baseband processes module 226A is shown to contain components 540A and 540B, implementing functions for the wireless technology used by application $514_1$ and $514_3$, respectively.

In the embodiment illustrated, hardware 550 is shown to interface with both components 540A and 540B. Hardware 550 may contains sufficient components to support processing of data for two wireless technologies simultaneously. Multiplexing component 552 may be incorporated to provide the interface to hardware 550. Multiplexing component 552 may operate according to a time division multiplexed scheme in which, in some intervals, it passes data according to the wireless technology for application $514_1$ and in other intervals it passes data for the wireless technology used by application $514_3$. When time multiplexed, the operation of hardware 550 may switch between data processing for the different wireless technologies at a sufficiently high rate that the radio may be regarded as supporting both wireless technologies concurrently.

Figure 5B:
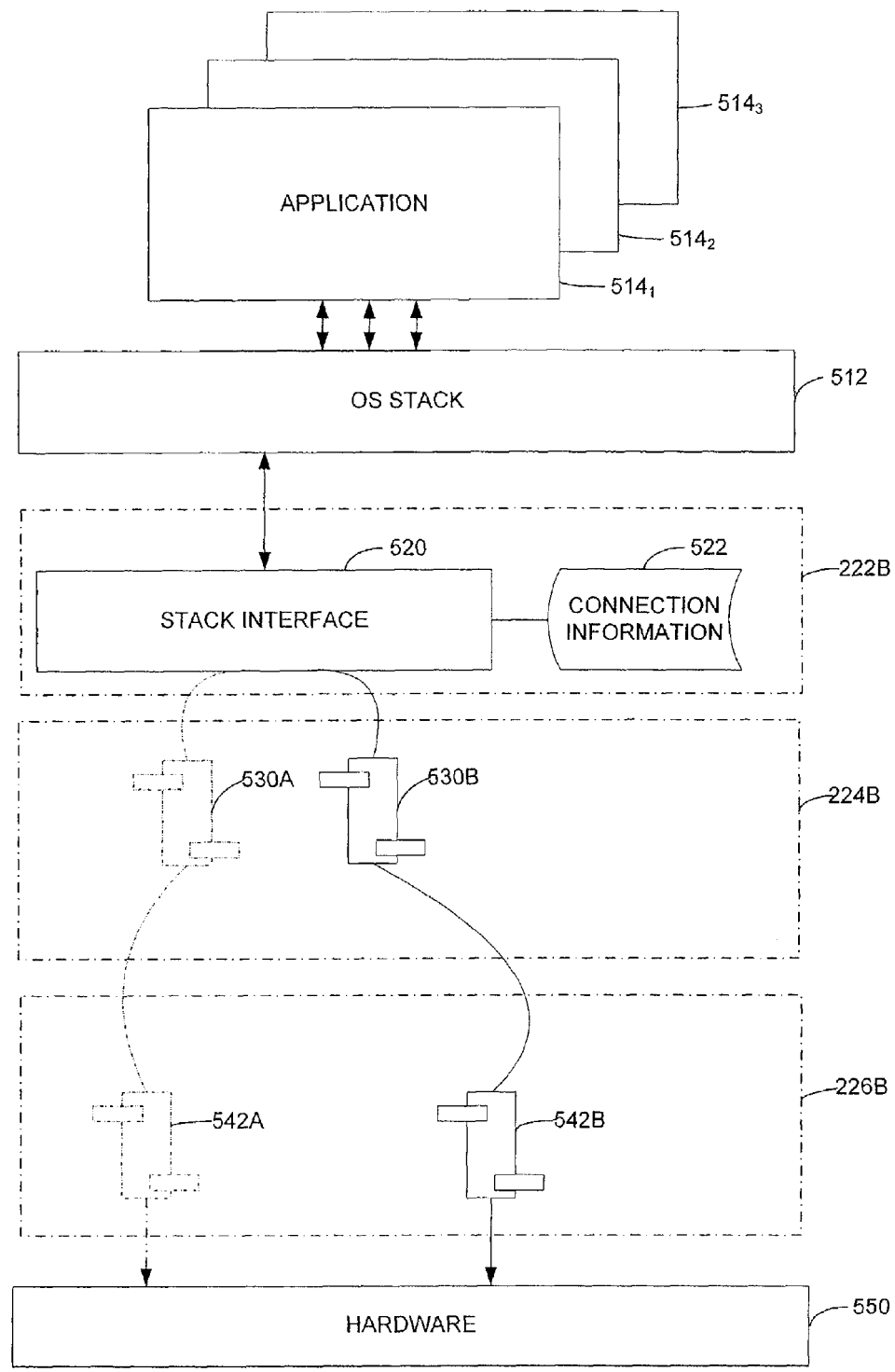
FIG. 5B is a sketch of a computing device of FIG. 5A in an alternative configuration.

FIG. 5B shows an alternative operating sequence in which two wireless technologies are supported sequentially. As in the example of FIG. 5A, FIG. 5B shows applications $514_1$ . . . $514_3$ communicating wirelessly through operating system stack 512. Operating system stack 512 interfaces with stack interface module component 520 within packet processing security module 222B. To the extent information is maintained about the connections that applications $514_1$ . . . $514_3$ have formed using a wireless technology with other components in other devices, that information may be maintained in connection information component 522.

At a first time, the software defined radio illustrated in FIG. 5B may be configured to communicate using a first wireless technology. To support communication with a first wireless technology, MAC processes module 224B may be configured, at the first time, with a component 530A. Likewise, baseband processes module 226B may be configured with component 542A to support wireless communication using the first wireless technology.

At some later time, the radio may be reconfigured for operation according to a second wireless technology. The reconfiguration may be made for any suitable reason. For example, cognitive module 252 (FIG. 2) may detect a source of interference disrupting communications according to the first wireless technology. In response, configuration logic module 242 (FIG. 2) may reconfigure the software defined radio for communication using a second wireless technology. This reconfiguration may be achieved, for example, by configuring MAC processes module 224B with component 530B and reconfiguring baseband processes module 226B with component 542B. Accordingly, at the second instance of time, communication may be achieved using the second wireless technology.

FIG. 5B illustrates any switching from the first wireless technology to the second wireless technology, the operation of some of the modules within data plane 220 (FIG. 2) change. However, packet processing and security module 222B was not reconfigured. Accordingly, connection information maintained within connection information component 522 was not changed as a result of the reconfiguration. Accordingly, though the software defined radio communicates using a different wireless technology, any connections established by applications $514_1$ . . . $514_3$ may be maintained.

Switching between profiles as described above may be controlled to occur in any suitable way. However, the flexibility provided by a software defined radio as described above enables "cognitive" control of the radio. Cognitive control allows operation of the radio to be controlled based on status information gathered as communications occur. The status information may relate to ongoing communications or may relate to communications that have been completed for which status information was previously stored. The status information may be used in any suitable way. For example, status information may be used to identify current operating conditions that are contributing to errors in communication.

Alternatively, status information may be used to allow control components within the radio to identify and implement appropriate adaptations to remedy specific conditions that are contributing to errors in communication.

Figure 6:
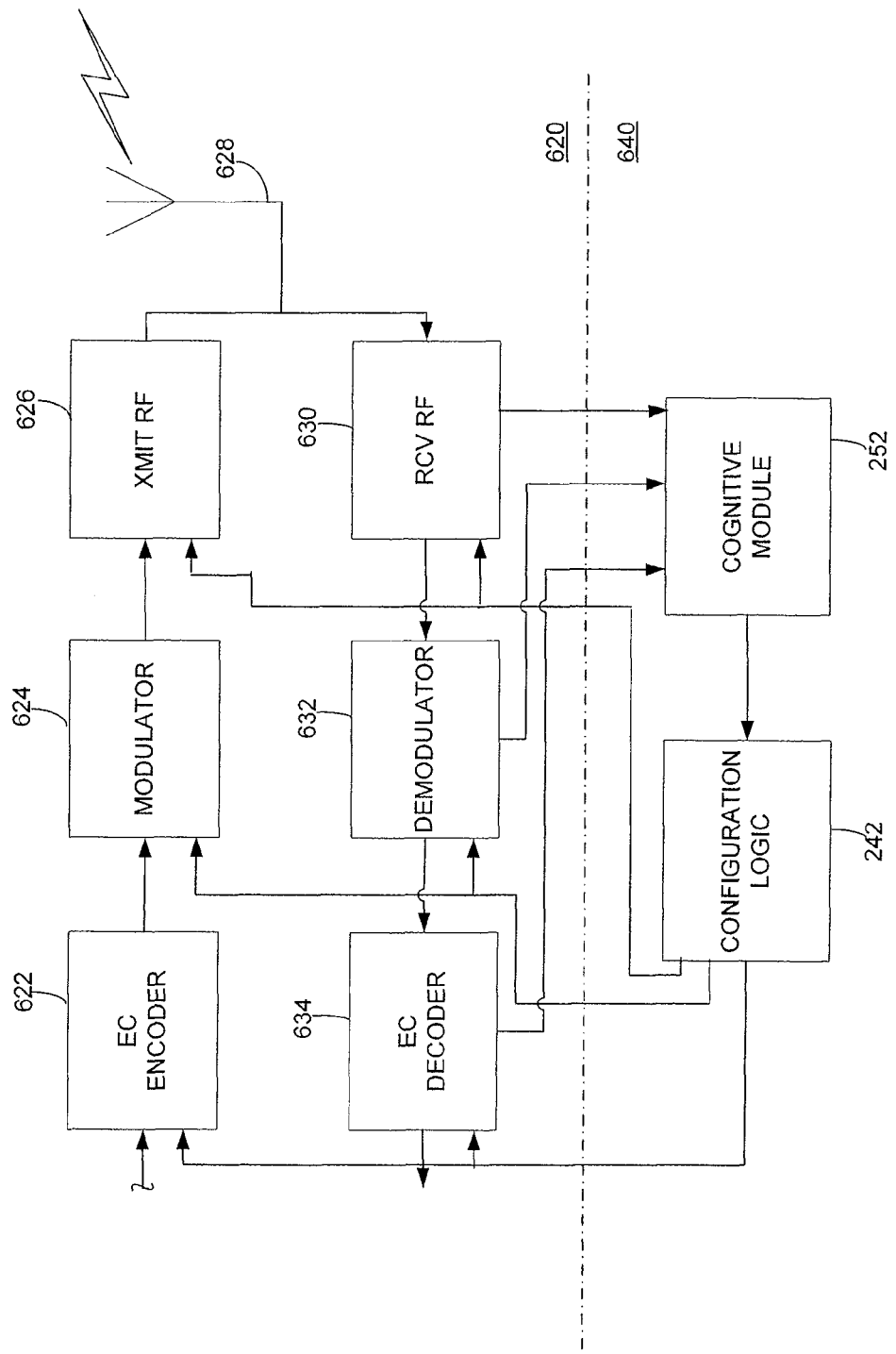
FIG. 6 is a sketch of a configurable radio according to embodiments of the invention.

Cognitive control may be facilitated by a feedback path between data processing components and control components. FIG. 6 illustrates components of a radio containing such a feedback path. The components illustrated in FIG. 6 may be a combination of hardware and software components forming a software defined radio as described above in connection with FIG. 2. However, any suitable components may be used to form a radio according to embodiments of the invention.

FIG. 6 illustrates that the components are organized into a data plane 620 and a control plane 640. Any suitable components may be included in data plane 620 or control plan 640. In the embodiment illustrated, control plane 640 includes configuration logic 242 and cognitive module 252. These components of the control plane may be as described above in connection with the embodiment of FIG. 2. However, the components may be implemented in any suitable way.

In the illustrative embodiment of FIG. 6, data plane 620 includes an error correction encoder 622, a modulator 624, an RF transmit component 626, antenna 628, an RF receive component 630, a demodulator 632 and an error correction decoder 634. The components of data plane 620 may also be implemented as in the embodiment described above in connection with FIG. 2. Accordingly, error correction encoder 622, modulator 624, demodulator 632 and error correction decoder 634 may be software components. Transmit RF components 622 and RF receive component 630 and antenna 628 may be hardware components.

Regardless of how each of the components is implemented, some or all of the components may interface to components in control plane 640. Such an interface may be provided in any suitable way. For example, interfaces in the form of interfaces $228_1$, $228_2$ or $228_3$ (FIG. 2) may be used. In the embodiment illustrated, the interface allows each of the components in data plane 620 to receive control information from configuration logic 242 and provide status information to cognitive module 252.

It is not necessary that all of the components in data plane 620 receive control information or that all generate status information. Nonetheless, by incorporating some control and status connections between data plane 620 and control plane 640 a form of feedback loop may be implemented. Status information generated by components in data plane 620 may be provided to one or more of the components in control plane 640. The components in the control plane may process the status information to identify conditions to which the radio should adapt for more effective communications. The components of control plane 640 may then determine appropriate adjustments to components in data plane 620 to adapt processing in the radio to those conditions. Because of the range of the status information that may be available from components in data plane 620, this adaptation may be made cognitively.

The specific functions performed by the components in data plane 620 are not crucial to the invention. In the embodiment illustrated, each of the components may perform functions that are known in the art. For example, error correction encoder 622 may receive groups of bits for transmission. Encoder 622 may map each group of bits into a new group of bits containing one or more error correcting bits.

Modulator 624 may receive the groups of bits formed by error correction encoder 622 and map the groups to a stream of symbols. Each symbol may communicate multiple bits based on a combination of modulation parameters specified within modulator 624. As a specific example, modulator 624 may map each symbol into a combination of phase and frequency values. However, the specific parameters varied by modulator 624 to represent each symbol is not critical to the invention. Any one or more transmission parameters may be varied, including phase, frequency, or amplitude. Additionally, modulator 624 may specify any number of values for each of these parameters to create a modulation scheme in which any number of symbols may be represented.

Regardless of the number and type of transmit parameters specified by modulator 624 for each symbol, the specified transmit parameters may be provided to an RF transmit component 626. RF transmit component 626 may be a transmit component as is known in the art, which may transmit an RF signal according to the parameters specified by modulator 624. The RF signal generated by RF transmit component 622 may be coupled to antenna 628, which may radiate the RF signal over a channel as part of communication with another device (not shown).

Antenna 628 may be an antenna as is known in the art. Antenna 628 may both transmit and receive RF signals. Though, in some embodiments, antenna 628 may be implemented as a set of antennas, and separate antennas may be used for transmitted and received signals.

Regardless of the specific antenna used to receive an RF signal, the received signal may be coupled to RF receive component 630. RF receive component 630 may be an RF component as is known in the art. Such a component may output detected characteristics of the received RF signal. The output characteristics may be the same as those specified by modulator 624. For example, RF receive component 630 may detect the phase, frequency or amplitude or any combination of parameters of a received RF signal.

The output of RF receive component 630 may be provided to demodulator 632. In some embodiments, demodulator 632 may be a component as is known in the art that performs the inverse operation of modulator 624. Accordingly, demodulator 632 may translate the received parameters from RF receive component 630 into a symbol according to a modulation scheme.

Demodulator 632 may transfer symbol information to error correction decoder 634. Error correction decoder 634 may be a component as is known in the art that performs the inverse of the encoding operation performed by encoder 622. Rather than adding error correcting bits, error correction decoder 634 may process a group of bits output by demodulator 632, including error correcting bits, to determine whether an error occurred in the propagation of the received signal. If so, error correction decoder 634 may use the error correcting bits to correct the error. Thereafter, error correction decoder 634 may output a stream of bits representing data received by the radio of FIG. 6. Though FIG. 6 does not expressly show components that generate data for transmission or use data that has been received, the data may be obtained from or provided to any suitable component. In the example of FIG. 2, data is generated by and provided to either an operating system 212 (FIG. 2) or applications 214 (FIG. 2). However, the source or destination of the data is not critical to the invention and the exemplary radio of FIG. 6 may be used in connection with any suitable components.

Though each of the components in data plane 620 may perform functions as are known in the art in transmitting or receiving data wireless, each of the components may be configured to provide status information or receive control information, allowing the components to be configured in a feedback loop according to embodiments of the invention. For example, error correction decoders 634 may be configured to provide status information to cognitive module 252 identifying, for each received transmission the number or errors corrected using error correcting coding. Similarly, demodulator component 632 may be configured to provide status information, such as a distortion vector. A distortion vector may, for each symbol received, indicate a degree of difference between a specific combination of RF parameters detected and a combination of parameters representing the nominal values of a valid symbol. RF receive components 630 may also provide status information. For example, RF receive component 630 may provide a received signal strength indicator or other status information that may be used within cognitive module 252 to identify or adapt to conditions currently existing a communication channel being used to send or receive data wirelessly.

One or more of the components within data plane 620 may also receive control inputs that may be used to control the components to adapt to channel conditions as identified by cognitive module 252. For example, error correcting encoder component 622 may receive a control input that varies the ratio of error correcting bits to data bits. As is known in the art, the ratio of error correcting bits to data bits may impact the number of bits errors that may be corrected in a transmission. By increasing the ratio, the radio may adapt to channel conditions that cause a higher rate of errors. Modulator component 624 may likewise have a control input. In response to values at the control input, modulator 624 may vary the type of modulation scheme it uses or the number of unique symbols it uses. Though reducing the number of unique symbols used by modulator 624 may reduce the data transmit rate, there may be a corresponding decrease in the number of errors that occur in transmission, with the net result being an increase in the effectiveness of the transmission. RF transmit component 626 may likewise include a control input. In response to values at its control input, RF transmit component 626 may vary the transmit power level or other parameter of an RF transmission.

Though FIG. 6 illustrates only a subset of the components that may exist within a cognitive radio, the figure illustrates that one or more feedback paths may be created by providing status information to cognitive module 252 and providing control information to one or more of the components in data plane 620.

Figure 7A:
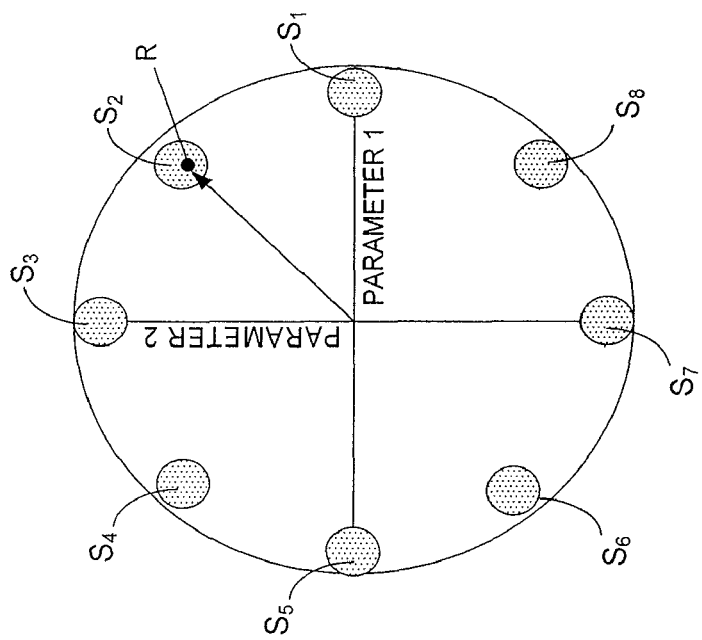
FIGS. 7A, 7B and 7C illustrate status information that may be generated in a modulator according to an embodiment of the invention.
Figure 7B:
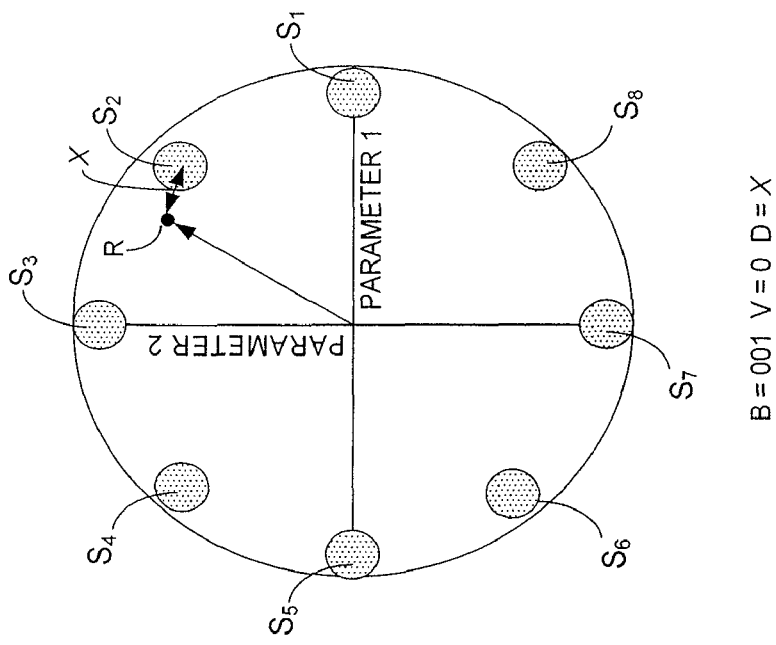
Figure 7C:
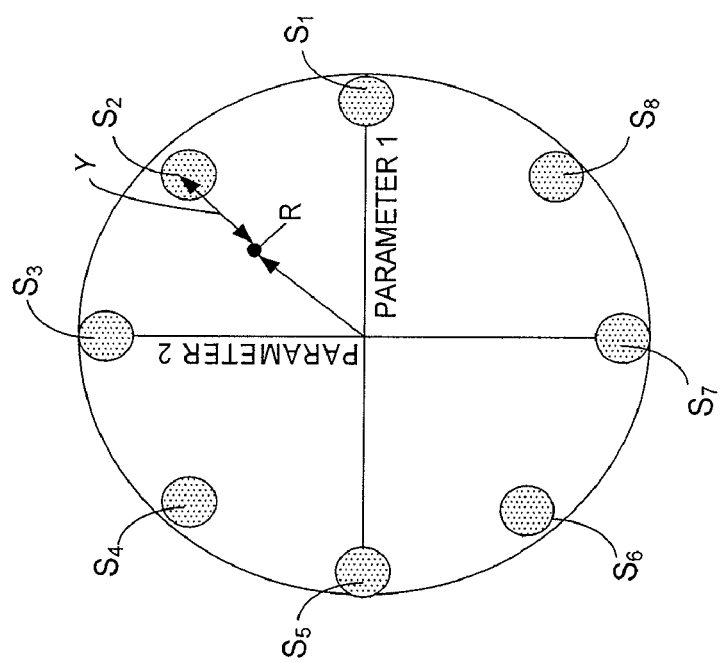

FIGS. 7A, 7B and 7C illustrate parameters that may be measured by one or more of the components within data plane 620 to generate status information. FIG. 7A illustrates transmission according to a modulation scheme in which two parameters of an RF signal may be varied to represent information transmitted. In this example, the two parameters are illustrated graphically in a two dimensional coordinate system. Each axis may represent one of the parameters. Each parameter may, for example, be a phase, a frequency, an amplitude or any other available parameter. In the example of FIG. 7A, eight regions of this parameter plot, each corresponding to a symbol, are shown. These regions are identified $S_1 \ldots S_8$. For example, the point R may represent the values for parameter 1 and parameter 2 of a received signal. As shown in FIG. 7A, the point R fall within region $S_2$. Accordingly, demodulator component 632 may map the received signal with parameter values R to a symbol $S_2$. A similar mapping may occur in conjunction with any of the other regions $S_1 \ldots S_8$.

In some instances, because of distortion in transmission or other errors, a received signal will not have values of the modulated parameters falling exactly within one of the regions $S_1 \ldots S_8$ representing nominal parameter values for a symbol. The difference between the nominal region and the actual received value may be regarded as a distortion vector. FIG. 7B illustrates parameter values R for a received signal falling near, but outside, of the range associated with region $S_2$. Accordingly, FIG. 7B illustrates a distortion vector X representing the difference between received values and a region corresponding to a nominal set of values representing an allowed symbol. Comparison of FIGS. 7A and 7B illustrates measurements that may be made in data plane 620 (FIG. 6) to generate status information.

In each of FIGS. 7A and 7B eight regions corresponding to nominal values of modulation parameters for eight different symbols are illustrated. Accordingly, each symbol may be mapped to up to three bits of information. Because, in both FIGS. 7A and 7B the received values are closest to region $S_2$, the received value may be mapped to a bit pattern associated with region $S_2$. In this example, the bit value 001 is mapped to region $S_2$. However, the specific mapping between regions and bit values is not critical to the invention and any suitable mapping may be used.

Though FIGS. 7A and 7B illustrate two situations in which received signals are mapped to the same symbol value, additional status information is available. Under the operating conditions illustrated in FIG. 7A, the received value falls within region $S_2$. Accordingly, demodulator component 632 (FIG. 6) or other suitable component may recognize that the received information corresponds to a valid symbol, and a valid bit, V, is set to a value of one. In contrast, FIG. 7B illustrates that the values of parameters 1 and 2 for a received RF signal fall outside any of the defined nominal regions associated with a valid symbol. Based on the closeness of received values R to region $S_2$, a demodulator may identify the received symbol as 001. Because the received value is outside all of the nominal regions, the demodulator may also generate an indication that the received parameters fall outside the nominal regions by setting a valid bit, V, to zero. Thus, the valid bit, V, may be one piece of status information provided by demodulator component 632 (FIG. 6) to cognitive module 252.

FIGS. 7A and 7B also indicate a second type of status information that may be generated by a demodulator component or other suitable component in a cognitive radio. In FIG. 7B, the values of parameter 1 and parameter 2 for a received signal, represented by R, are separated from the nearest region $S_2$ by a distance X. This distance may represent a distortion vector. Accordingly, FIG. 7B illustrates a distortion vector, D, with a value of X. In contrast, FIG. 7A illustrates that the received signal has values of parameters 1 and parameter 2 falling within region $S_2$ and a distortion vector, D, with a value of zero. On the other hand, FIG. 7C illustrates a received signal with a value of parameter 1 and parameter 2 identified by R that has a larger distortion vector than in FIG. 7B. In the example of FIG. 7C, R is separated from the nearest region of nominal symbol values $S_2$ by distance Y, creating a distortion vector D, with a value of Y.

Though in each of the examples of FIG. 7A, 7B and 7C, the received value is mapped to a set of bits, B=001, additional information is available to components processing the received signal. As described above, a valid bit, V, may be used to indicate error conditions. Likewise, a distortion vector D may be used to indicate both the presence and magnitude of error conditions present.

This and other status information may be used to identify adaptations to provide more effective communication despite channel conditions that may induce errors. Cognitive module 252 may process the status information to identify patterns of status values indicating error conditions to which it may adapt. The patterns may be based on single values of status variables, trends in values of a single status variable, correlations between the values of two or more status parameters or any other suitable combination of status values. The patterns may relate to past or present information. As a specific example, error correction decoder 634 may output a status value indicating the rate at which bit errors are corrected in received signals. A high rate of error correction may indicate channel conditions for which an adaptation is desirable or necessary. Alternatively, a trend showing an increase over time in the rate at which bit errors are corrected may indicate deteriorating channel conditions. Cognitive module 252 may use this information to predict a time by which an adaptation will be required and generate an indication of the adaptation at an appropriate time. Cognitive module 252 may identify the appropriate time based on the rate at which the error level is increasing or based on any other suitable available information.

As another example, cognitive module 252 may identify a need for an adaptation based on a combination of status values. For example, status information from RF receive component 630 may indicate a high received signal strength and information from either demodulator component 632, error correction decoder 634 or other higher level components within the cognitive radio may indicate a high error rate for transmissions. Because high received signal strength is generally associated with a low error rate, cognitive module 252 may identify an exceptional operating condition when there is a high received signal strength correlated with a high error rate. Such an exceptional operating condition may, for example, be associated with a source of interference in a frequency spectrum that overlaps the channel being used for wireless communications. In response, cognitive module 252 may signal an adaptation that involves reconfiguring the cognitive radio for transmission with a wireless technology that uses a different frequency spectrum.

Regardless of the specific status information used by cognitive module 252 to identify whether it is necessary or desirable to reconfigure the radio, any suitable reconfiguration may be used to adapt to conditions disrupting communications. FIG. 8A provides an example of a possible reconfiguration. FIG. 8A illustrates regions associated with nominal values of two parameters of a received signal as in FIG. 7A. However, FIG. 8A differs from FIG. 7A in that only four nominal regions, $S_1 \ldots S_4$ are shown. Because fewer regions are shown in FIG. 8A, each of the regions may be made larger. As a result, a received signal having a combination of parameter values illustrated by R falls within nominal region $S_2$ in the example of FIG. 8A, but the same combination of values would be outside of any of the nominal regions $S_1 \ldots S_8$ in FIG. 7A. In addition, the separation between the nominal regions $S_1 \ldots S_4$ is greater than the separation between the nominal regions $S_1 \ldots S_8$ illustrated in FIG. 7A. Accordingly, even if a signal is distorted, it is less likely that the distortion will cause the actual received signal to be associated with a nominal region representing an incorrect symbol. Fewer nominal signal values may be used, as illustrated in FIG. 8A, by changing a value of the control input to modulator component 624. A corresponding change may be made to demodulator component 632. Though, a consequence of reducing a number of nominal regions as illustrated in FIG. 8A is that the number of bits per symbol is decreased. For example, in FIG. 8A, when a received signal falls within region $S_2$, a bit value B=01 may be assigned.

Because only four possible values may be identified by the four regions, only two bits of information are conveyed. In contrast, the eight possible nominal regions illustrated in FIG. 7A allows three bits of information to be represented in a symbol. Because an adaptation that reduces the number of bits per symbol may have countervailing effects, cognitive module 252 may use any available information to determine whether such an adaptation is desirable. Such information may include stored information about conditions under which such an adaptation was previously attempted and whether or not the adaptation improved overall effectiveness of the communication. Accordingly, historical information and any other suitable available information may be used by cognitive module 252 to identify both whether an adaptation should be made and the specific type of adaption to be made.

Figure 8B:
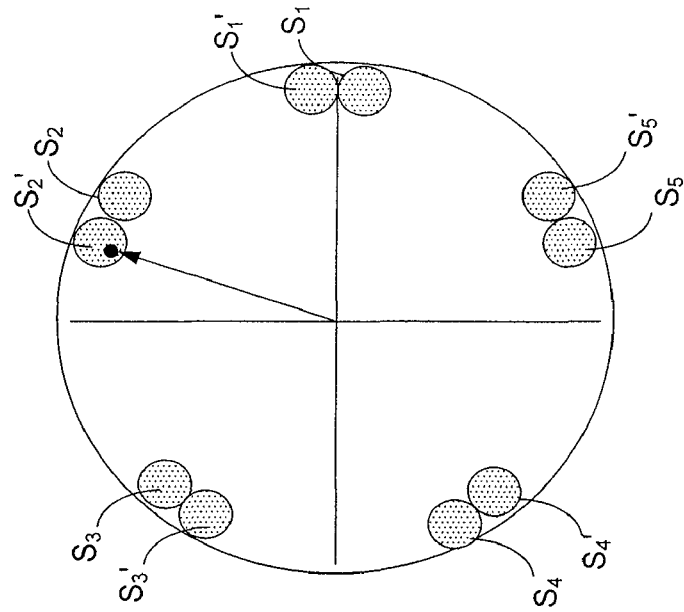
FIGS. 8A and 8B illustrate adaptations that may be made in a modulator according to embodiments of the invention.
Figure 8A:
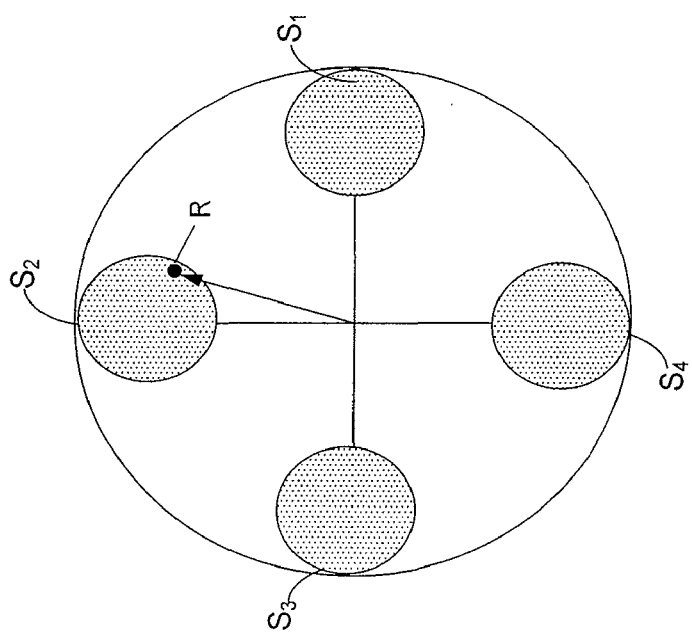

FIG. 8B illustrates another possible adaptation that may be made. As in FIG. 8A, the number of nominal regions is reduced relative to that of FIG. 7A. FIG. 8B shows five nominal regions. In this example, each of the nominal regions is formed by intersecting two nominal regions of the type illustrated in FIG. 7A. Thus, each of the nominal regions, rather than being generally circular as illustrated in FIGS. 7A . . . 7C and 8A, is more generally shaped as a figure eight. Accordingly, FIG. 8B illustrates that a range of adaptations is possible in varying a mapping between parameter values and symbols.

In FIG. 8B, the five nominal regions represent 2.25 bits of information. Accordingly, FIG. 8B also illustrates that a specified modulation scheme does not have to have a number of bits per symbol that is a multiple of two.

Figure 9B:
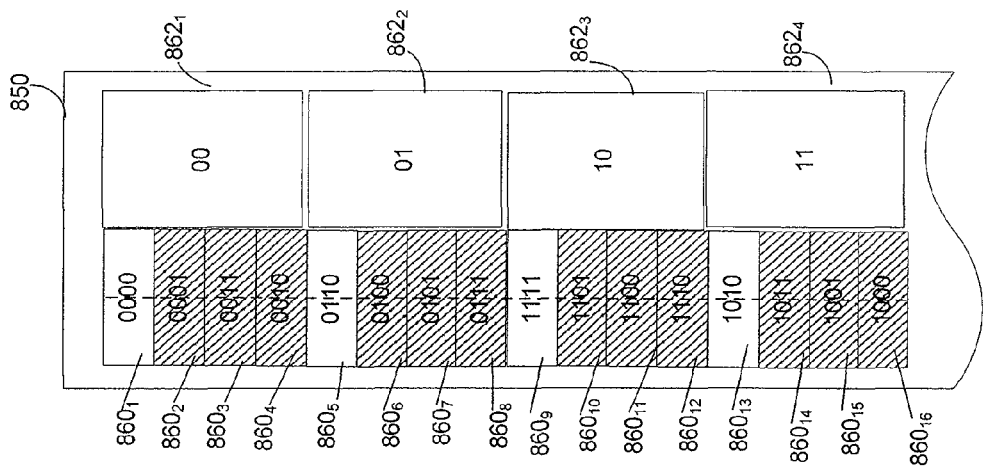
FIGS. 9A and 9B represent adaptations that may be made in an encoder according to embodiments of the invention.
Figure 9A:
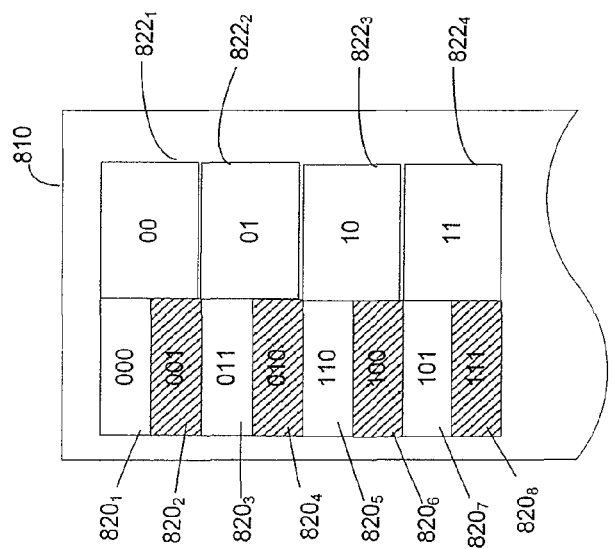

FIGS. 9A and 9B illustrate another form of adaptation that may be made. FIGS. 9A and 9B illustrate different mappings between received symbols or groups of symbols and output data values. Such a mapping may be performed by error correction decoder 634 or any other suitable component within a cognitive radio. The mapping may be represented by values in a data structure stored in a computer readable media 810 or incorporated into a computing device in any other suitable way. In the example of FIG. 9A, eight symbol values $820_1 \ldots 820_8$ is each mapped to output data bits represented by $822_1 \ldots 822_4$. As can be seen in FIG. 9A there is not a one-to-one mapping between symbol values and output data bits. Rather, in the example illustrated, two symbol values are mapped to each group of output data bits. For example, symbol values $820_1$ and $820_2$ are mapped to output bit $822_1$. Symbol values $820_3$ and $820_4$ are mapped to output bit $822_2$. Symbol values $820_5$ and $820_6$ are mapped to output bit $822_3$ and symbol values $820_7$ and $820_8$ are mapped to output data bit $822_4$. Because the full range of possible symbol values is mapped to only four combinations of output bits, the output data is represented by only two output bits as illustrated in FIG. 9A.

This reduction in the number of output data bits represented by each symbol allows error correction. For example, only certain of the symbol values may be transmitted. In this example, only symbol values $820_1$, $820_3$, $820_5$ and $820_7$ may represent allowable transmitted symbol values. If any of the other symbol values, $820_2$, $820_4$, $820_6$ or $820_8$ is received, an error correction decoder may identify both that an error has occurred and may correct it. For example, if symbol $820_2$ is received, the error correction decoder may identify that an error has occurred by may correct it by mapping the received symbol to output data values $822_1$, which, because that data value represents the closest to the transmitted symbol, is most likely to be the correct data value. Errors may similarly be detected and corrected if symbols $820_4$, $820_6$ or $820_8$ are received.

FIG. 9B illustrates that an adaptation may be made by varying the mapping between received symbols and output data bits. Though FIGS. 9A and 9B represent simple error correcting codes, they illustrate that increasing the number of bits devoted to error detection and correction may improve the likelihood that information is received correctly. In the example of FIG. 9B, 16 symbol values are shown, $860_1 \ldots 860_{16}$. The 16 symbol values may correspond to 16 different nominal modulation regions in a parameter space as illustrated in FIGS. 7A, 7B or 7C. Alternatively, the 16 symbol values illustrated in FIG. 9B may represent the values of two consecutive symbols received using a modulation scheme as illustrated in FIG. 8A in which two bits per symbol are encoded.

Regardless of how the values representing symbols $860_1 \ldots 860_{16}$ are generated, FIG. 9B shows that four separate symbol values are matched to each combination of output bits. For example, symbols $860_1 \ldots 860_4$ are mapped to output bits $862_1$. Symbol $860_5 \ldots 860_8$ are mapped to output bits $862_2$. The remaining symbols $860_9 \ldots 860_{16}$ are mapped to output bits $862_3$ and $862_4$ in a similar fashion. In each case, four symbols are mapped to one set of output data bits. In the example of FIG. 9B, four bits of symbol data are mapped to two bits of output data. Such a condition illustrates a simple error correcting code with two bits of error correction. In contrast, in the example of FIG. 9A, three bit symbols are mapped to two bits of output data. Accordingly, FIG. 9A illustrates a simple example of a one bit error correcting code. Using more bits for error correction as illustrated in FIG. 9B may, under some operating conditions, increase the effectiveness of communications because fewer received signals need to be disregarded because of errors. According to embodiments of the invention, cognitive module 252 may detect, based on status information provided by one or more components within data plane 620, conditions under which changing the number of error correcting bits used may increase the effectiveness of communications. In response to such a determination, cognitive module 252 may trigger configuration logic 242 to generate commands to error correcting encoder 620 and/or error correction decoder 634 to change the number of error correcting bits in use.

FIGS. 8A, 8B and 9A and 9B illustrate possible adaptations that may be made based on status information. Regardless of the specific type of status information available and the specific adaptations made in response to detected patterns within that status information, a cognitive radio according to embodiments of the invention may be used in a process of communication as illustrated in FIG. 10.

Figure 10:
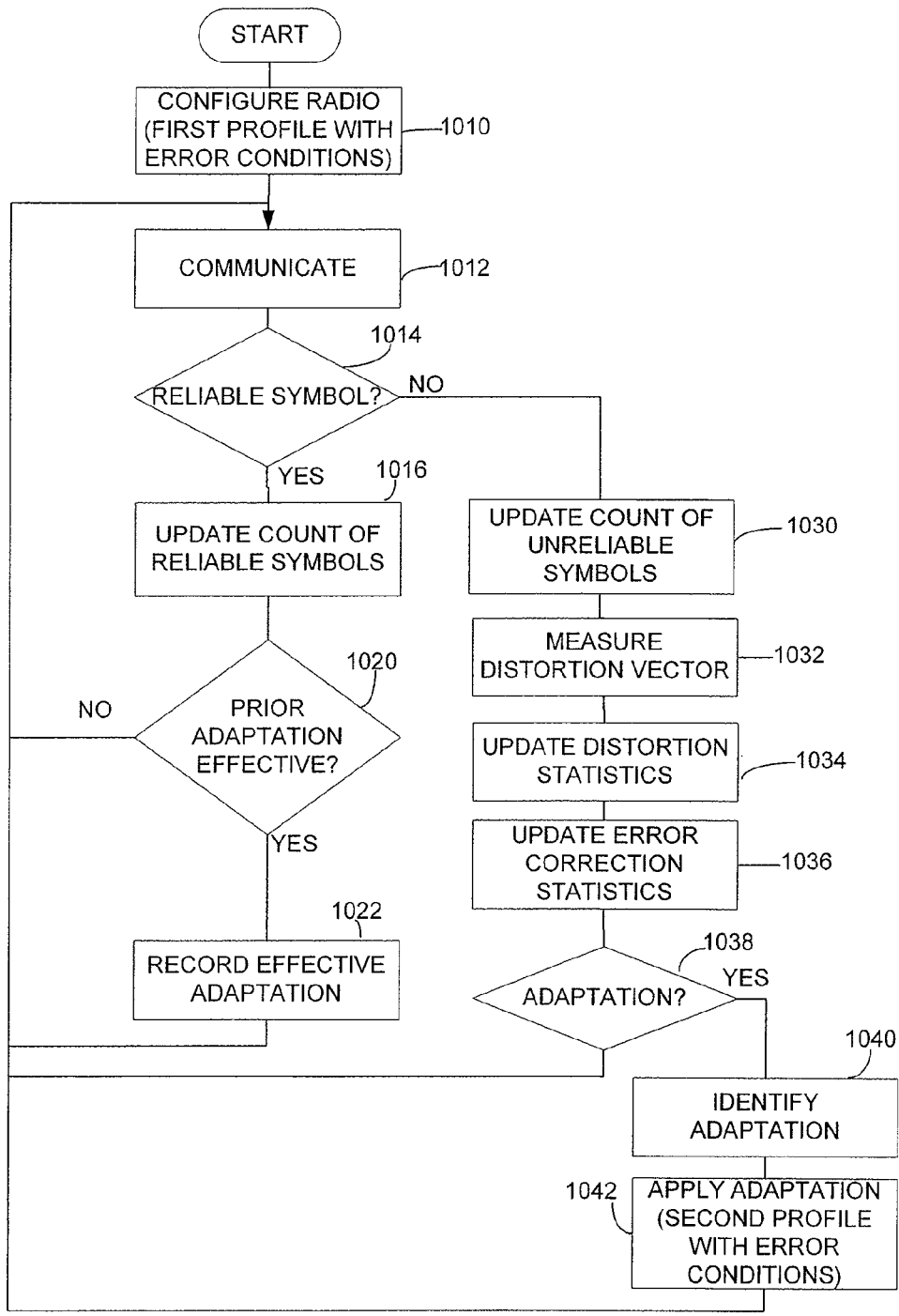
FIG. 10 is a flowchart of a process of communicating according to an embodiment of the invention.

The process of FIG. 10 begins at block 1010. At block 1010, a cognitive radio may be configured for communications. For a radio in the form illustrated in FIG. 2, the radio may be configured by applying a first profile from profile store 250. However, the specific mechanism by which an initial configuration is selected and applied at block 1010 is not critical to the invention.

In addition to the information described above there may be stored in each of the profiles, a profile for a cognitive radio may include that information identifying error conditions under which an adaptation may be made. Error conditions may be expressed as thresholds, patterns or in any other suitable way.

Once the radio is configured, processing proceeds to block 1012. At block 1012, the radio is used for communications according to the defined profile. As part of communications at block 1012, status information may be generated and analyzed. For example, one type of information that may be collected as part of ongoing communication is a valid bit, V, as illustrated in conjunction with FIGS. 7A, 7B and 7C. For each symbol received, processing may branch at decision block 1014 based on the value of the valid bit associated with the symbol. If the valid bit associated with a received symbol indicates that the symbol is reliable, the process may branch to block 1016.

If the symbol is deemed reliable, processing at block 1016 may update a count of reliable symbols. Updating a count of reliable symbols may involve changing the value in a data structure stored in computer readable media or may be performed in any other suitable way. Storing a count of reliable symbols is an example of a mechanism that may be used to record historical status information.

The process may then proceed to decision block 1020. At decision block 1020, the process may branch depending on whether an adaptation was previously applied to the radio and the adaptation can be deemed effective based on performance of the radio since the adaptation was applied. Processing to identify that an adaptation was effective may be performed in any suitable way. The processing may depend on the nature of the prior adaptation or the nature of the condition that triggered the prior adaptation. For example, if the prior adaptation was triggered by a high error rate, processing in block 1020 may entail checking whether the error rate, following the adaptation, decreased to an acceptable level.

Regardless of how an effective adaptation is identified at block 1020, if the prior adaptation is deemed effective, the process branches to block 1022. At block 1022, information concerning the effective adaptation is recorded. Processing at block 1022 may entail writing information into a nonvolatile computer readable media or making a record in any other suitable way. The type of information recorded at block 1022 may depend on the nature of the adaptation performed, the conditions that triggered the adaptation, processing to assess whether the adaptation was effective or any other suitable type of information. In the example of an adaptation performed in response to an error rate above a threshold, information recorded at block 1022 may indicate the amount of decrease in the error rate following the adaptation.

Once the information on prior adaptation is recorded at block 1022, the process may loop back to block 2012 where communication continues. If a prior adaptation was not effective or no prior adaptation was performed, processing may also loop back from decision block 1020 to block 1012. In looping back from decision block 1020 to block 1012, the example embodiment of FIG. 10 does not indicate that information about an ineffective adaptation is stored. However, embodiments of the invention may be constructed in which information is stored about both effective and ineffective adaptations. Accordingly, the invention is not limited to the specific embodiment shown in FIG. 10.

The flowchart of FIG. 10 illustrates other paths that may be taken in other operating conditions. These paths indicate that different processing may be performed in response to different operating conditions. For example, if a received symbol is not deemed reliable, the process may branch from decision block 1014 to block 1030. At block 1030, a count of unreliable symbols may be updated. The counts stored at block 1016 and 1030 may be used together to determine a value of a status indicator. In this example, a ratio may be formed between the number of reliable and unreliable symbols received to yield a status value that may indicate channel conditions requiring adaptation.

Processing following an unreliable symbol may also include measuring a distortion vector at block 1032. A distortion vector may be measured in any suitable way. In some embodiments, the distortion vector may be measured as illustrated in FIGS. 7B and 7C, by a demodulator.

Regardless of how the distortion vector is measured, the process may proceed to block 1034 where previously stored distortion statistics are updated. Processing at block 1034 may be performed in any suitable way. As an example, a rolling average of the magnitude of the distortion vectors determined over a suitable time interval may be computed as each new distortion vector is provided. The updated rolling average may be stored at block 1034. In addition to an average value, a variance or other higher level statistic of the measured distortion may be computed and stored. These values may be used in later processing to identify either a need for an adaptation or an appropriate form of adaption.

Other status information may also be stored. In the example of FIG. 10 the process proceeds to block 1036 where error correction statistics are stored. As is known in the art, error correcting codes may allow the correction of multiple bit errors. An error correcting decoder, such as decoder 634 (FIG. 6), may, in the course of applying an error correcting code, determine a number of bit errors that have occurred. The rate at which these errors are occurring may be recorded at block 1036 in a memory structure or other suitable computer readable media. The information on the numbers of errors corrected may be stored in any suitable way. For example, the statistical information concerning errors may be stored as a rate at an instant in time. Alternatively, a rolling average of an error rate may be stored in a computer readable media as each symbol is processed. Alternatively or additionally, a variance or higher order statistic computed from the error rate may be stored at block 1036.

Although FIGS. 9A and 9B illustrate error correcting coding used to detect bit errors, other forms of error detection and error correction may be employed in a cognitive radio. For example, a frame error rate may be tracked and statistics of a frame error rate may likewise be stored at block 1036. Accordingly, the invention is not limited to adaptations based on the specific types of errors or status information described above.

Regardless of the nature of the status information stored, the process may proceed to decision block 1038 where, based on the collected status information, a decision is made whether adaptation is required. As described above, processing at block 1038 may entail comparing current status information to thresholds for detecting patterns in stored status information. The processing at block 1038 may entail operations on the single type of status information or combinations or correlations of multiple types of status information. Regardless of the specific processing at block 1038 if no adaptation is to be made, the process loops back to block 1012, where communication continues.

Processing at decision block 1038 may entail comparison of status information, whether currently generated or previously stored, with error conditions associated with the first profile retrieved at block 1010. However, processing may be performed at decision block 1038 in any suitable way.

Regardless of how the determination is made whether to perform an adaptation at block 1038, if an adaptation is performed, the process branches to block 1040. At block 1040 an adaptation is identified. The adaptation may be identified in any suitable way. For example, information previously recorded at block 1022 may indicate an effective adaptation in response to conditions as indicated by the current status information. In the example of FIG. 10, identifying an adaptation at block 1040 may entail selecting a second profile based on an expectation that communications according to the second profile will be more effective. However, the adaptation may be identified in any suitable way.

The process may then proceed to block 1042. At block 1042 the identified adaptation is applied. In the example illustrated in which the process of FIG. 10 is performed in a computing device such as is illustrated in FIG. 2, the adaptation may be applied by obtaining a second profile from profile store 250 and applying it to a software defined radio to reconfigure the hardware and software components of the radio. In addition, as illustrated in FIG. 10, a profile may include a different set of error conditions than were selected at block 1010. Accordingly, as communication continues when the process loops back to block 1012 and again returns to decision block 1038, a different set of conditions may be applied to determine whether a further adaptation should be made.

The process may proceed iteratively in this fashion with communications continuing and the radio adapting continuously to conditions currently affecting communications over a channel.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device comprising:
   at least one antenna;
   a plurality of hardware components, coupled to the at least one antenna, to generate signals to transmit through the at least one antenna or process signals received through the at least one antenna;
   at least one memory component encoded with computer executable modules, the computer executable modules comprising:
      a data generating or consuming module for generating data for inclusion in the signals to transmit or to operate on data extracted from the signals received through the at least one antenna;
      software defined radio modules, comprising:
         a plurality of data processing modules, the plurality of data processing modules collectively configured to process data exchanged between the hardware components and the data generating or consuming module, at least a first portion of the data processing modules being configurable in response to control inputs, and at least a second portion of the data processing modules having a status output to output a value indicating a condition associated with the transmission or processing signals through the at least one antenna; and
         at least one control module, the at least one control module for receiving the status output, choosing, based on the condition, at least one parameter of a wireless technology to adjust to compensate for the condition, and generating at least one control signal to be provided to the control inputs of the first portion of the data processing modules to adjust the at least one parameter, the wireless technology being one with which the plurality of data processing modules are configured.

2. The computing device of claim 1, wherein the second portion of the data processing modules comprises a demodulator.

3. The computing device of claim 2, wherein the demodulator outputs at the status output of the demodulator a value (X, Y) representative of a distortion vector.

4. The computing device of claim 3, wherein:
   the second portion of the data processing modules comprises a modulator; and
   the at least one control module comprises a cognitive module to specify a control input to the modulator based on the value of the distortion vector.

5. The computing device of claim 4, wherein the cognitive module specifies the control input in response to a trend in the distortion vector.

6. A method of operating a computing device having software components implementing a software defined radio, the method comprising:
   receiving signals representative of a plurality of wireless communications;
   processing the signals with the software defined radio, the processing comprising generating status information about a difference between a received signal and a predefined state of the received signal, the predefined state being defined by a wireless technology with which the software defined radio is configured;

collecting status information regarding the signals over a time interval; and reconfiguring the software defined radio based on statistics of the status information over the time interval, wherein the reconfiguring comprises choosing, based on the statistics of the status information, at least one parameter of the wireless technology to adjust to compensate for the difference and generating at least one control signal to reconfigure the software defined radio.

7. The method of claim 6, wherein the status information comprises a distortion vector (X, Y).

8. The method of claim 7, wherein the software defined radio comprises a software demodulator and the generating comprises generating the status information in the software demodulator.

9. The method of claim 6, wherein the status information comprises a number of bits difference between a received signal and a predefined bit pattern.

10. A method of operating a computing device having software components implementing a software defined radio, the method comprising:

configuring the software defined radio according to a first profile, the first profile having associated therewith operating conditions;

receiving signals representative of a plurality of wireless communications;

processing the signals with the software defined radio, the processing comprising generating status information about a difference between a received signal and a state of a set of predefined states;

collecting the status information; and when the state indicates that the software defined radio is not operating in accordance with operating conditions associated with the first profile, configuring the software defined radio according to a second profile, the configuring being based on the status information, the configuring according to the second profile comprising choosing from among a plurality of parameters, based on the status information about the difference, at least one parameter of a wireless technology to adjust and selecting the second profile based at least in part on the at least one parameter.

11. The method of claim 10, further comprising:

selecting the second profile based at least in part on status information stored following a prior reconfiguration of the software defined radio.

12. The method of claim 11, wherein generating status information comprises computing at a plurality of times a distortion vector (X, Y).

13. The method of claim 11, wherein generating status information comprises tracking a number of bit errors detected through the use of an error correcting code.

14. The method of claim 11, wherein generating status information comprises tracking a rate of symbols received that are within a threshold level of deviation from a nominal value.

15. The method of claim 1, wherein at least one of the plurality of data processing modules operates according to a configurable parameter of at least one configurable parameter, and wherein the at least one control module chooses the at least one parameter of the wireless technology at least in part by selecting a parameter of the at least one configurable parameter associated with a particular data processing module and generates a control signal to be provided to the particular data processing module.

16. The method of claim 1, wherein the at least one control module, upon receiving the status output, determines, based on the condition, whether any adjustment to the wireless technology is to be carried out, and performs the choosing in response to determining that an adjustment is to be carried out.

17. The method of claim 1, wherein the at least one control module, upon choosing the at least one parameter to adjust, identifies at least one value for the at least one parameter, wherein the at least one control module generates the at least one control signal to adjust the at least one parameter including the at least one value.

18. The method of claim 1, wherein the at least one control module chooses the at least one parameter of the wireless technology at least in part by choosing properties to adjust of a waveform to be transmitted and/or received by the at least one antenna.

19. The method of claim 18, wherein the at least one control module chooses properties of a waveform to be transmitted and/or received at least in part by choosing a frequency or an amplitude.

20. The method of claim 1, wherein the at least one control module chooses the at least one parameter of the wireless technology at least in part by choosing properties to adjust of a modulation scheme to be used for transmitting data.

* * * * *